US00RE48040E

(19) United States
(12) Reissued Patent
Moghtaderi et al.

(10) Patent Number: US RE48,040 E
(45) Date of Reissued Patent: Jun. 9, 2020

(54) INTEGRATED CHEMICAL LOOPING AIR SEPARATION IN LARGE-SCALE OXY-FUEL PLANTS

(71) Applicant: NEWCASTLE INNOVATION LIMITED, Callaghan, New South Wales (AU)

(72) Inventors: Behdad Moghtaderi, Callaghan (AU); Terry Fitzgerald Wall, Callaghan (AU); Kalpit Vrajeshkumar Shah, Callaghan (AU)

(73) Assignee: THE UNIVERSITY OF NEWCASTLE, Callaghan, New South Wales (AU)

(21) Appl. No.: 15/352,554

(22) Filed: Nov. 15, 2016

Related U.S. Patent Documents

Reissue of:
(64) Patent No.: 9,346,013
Issued: May 24, 2016
Appl. No.: 14/346,688
PCT Filed: Sep. 21, 2012
PCT No.: PCT/AU2012/001136
§ 371 (c)(1),
(2) Date: Mar. 21, 2014
PCT Pub. No.: WO2013/040645
PCT Pub. Date: Mar. 28, 2013

(30) Foreign Application Priority Data

Sep. 23, 2011 (AU) ..... 2011903925
Feb. 28, 2012 (AU) ..... 2012900768

(51) Int. Cl.
*C01B 13/08* (2006.01)
*F23C 9/08* (2006.01)
(Continued)

(52) U.S. Cl.
CPC ..... *B01D 53/73* (2013.01); *B01D 53/62* (2013.01); *C01B 13/08* (2013.01); *F01K 13/00* (2013.01);
(Continued)

(58) Field of Classification Search
CPC ..... C01B 13/08; F23L 7/007; F23C 9/003; F01K 13/00; B01D 53/73; B01D 53/62; F23J 15/06
See application file for complete search history.

(56) References Cited

U.S. PATENT DOCUMENTS

2009/0020405 A1 1/2009 Fan et al.
2010/0077946 A1 4/2010 D'Agostini
(Continued)

FOREIGN PATENT DOCUMENTS

DE 10 2008 009 129 8/2009
EP 2 224 165 A2 9/2010
WO WO 2010052415 * 5/2010 ..... F23C 10/005

OTHER PUBLICATIONS

Translation of WO 2010052415, 2010.*
(Continued)

*Primary Examiner* — Ling X Xu
(74) *Attorney, Agent, or Firm* — Ladas & Parry, LLP

(57) ABSTRACT

An integrated chemical looping air separation unit (5) in a large-scale oxy-fuel power generating plant takes a portion of recycled flue gas (6) via a recycling conduit (7) through a heat exchanger (8) to a reduction reactor (9). The reduction reactor (9) exchanges oxidized metal oxide with an oxidation reactor (11) via transfer means (10) which return reduced metal oxide from the reduction reactor (9) to the oxidation reactor (11). This enables the reduction reactor (9) to feed a mixture of oxygen and recycled flue gas into the boiler (13) of the power generating plant in a more energy efficient manner than conventional oxy-fuel power plants using air separation units.

19 Claims, 24 Drawing Sheets

(51) Int. Cl.

| | |
|---|---|
| ***B01D 53/73*** | (2006.01) |
| ***B01D 53/62*** | (2006.01) |
| ***F01K 13/00*** | (2006.01) |
| ***F23C 9/00*** | (2006.01) |
| ***F23J 15/06*** | (2006.01) |
| ***F23L 7/00*** | (2006.01) |

(52) U.S. Cl.

CPC ..... *F23C 9/003* (2013.01); *F23J 15/06* (2013.01); *F23L 7/007* (2013.01); *B01D 2258/0283* (2013.01); *B01D 2259/4516* (2013.01); *F23C 2900/99008* (2013.01); *F23J 2215/50* (2013.01); *F23J 2900/15061* (2013.01); *F23L 2900/07001* (2013.01); *Y02E 20/322* (2013.01); *Y02E 20/326* (2013.01); *Y02E 20/344* (2013.01); *Y02E 20/346* (2013.01); *Y02E 20/363* (2013.01); *Y02P 20/124* (2015.11)

(56) References Cited

U.S. PATENT DOCUMENTS

| | | | | |
|---|---|---|---|---|
| 2010/0299997 | A1 | 12/2010 | Hoteit et al. | |
| 2011/0129408 | A1 | 6/2011 | Jadhav ..... | F23C 99/00 423/437.1 |
| 2012/0100055 | A1 | 4/2012 | Weber | |

OTHER PUBLICATIONS

Office Action from EPO Application No. 12832876.2 dated May 11, 2016.

"Handbook of fluidization and fluid-particle systems", edited by Wen-Ching Yang, Marcel Dekker, Inc., New York, NY, 2003, pp. 591 to 592.

"Chemical looping systems for fossil energy conversions", Liang-Shih Fan, AIChE and Wiley, Hoboken, NJ, 2010, pp. 178 to 180 and 184 to 185.

Moghtaderi, B., "Application of Chemical Looping Concept for Air Separation at High Temperatures", Energy Fuels, American Chemical Society, vol. 24, 2010, pp. 190-198; Published on web Nov. 10, 2009.

ESSR dated Apr. 9, 2015 from corresponding EP Patent Application No. 12832876.2.

PCT International Search Report from PCT/AU2012/001136 dated Jan. 9, 2013.

PCT International Written Opinion from PCT/AU2012/001136 dated Jan. 9, 2013.

PCT International Preliminary Report on Patentability Chapter I from PCT/AU2012/001136 dated Mar. 25, 2014.

* cited by examiner

*PRIOR ART*

Amended FIG. 1

$Me_xO_{y-2}$ (s) + $O_2$ (g) → $Me_xO_y$ (s) *Oxidation or $O_2$ coupling* (1)
$Me_xO_y$ (s) → $Me_xO_{y-2}$ (s) + $O_2$ (g) *Reduction or $O_2$ uncoupling* (2)

*PRIOR ART*

Amended FIG. 2

Amended FIG. 5

Temperature swing CLAS process

Amended FIG. 22

PRIOR ART
Loop Seal
NEW
Loop seal, reverse
V-valve or fluoseal
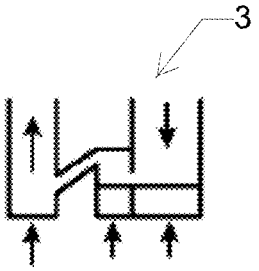
NEW
FIG. 25B

INTEGRATED CHEMICAL LOOPING AIR SEPARATION IN LARGE-SCALE OXY-FUEL PLANTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is the U.S. National Stage of International Patent Application No. PCT/AU2012/001136 filed on Sep. 21, 2012, which claims priority to Australian Patent Application No. 2011903925, filed on Sep. 23, 2011, and Australian Patent Application No. 2012900768, filed on Feb. 28, 2012, the disclosures of which are hereby incorporated by reference in their entireties.

FIELD OF THE INVENTION

This invention relates to a method and apparatus for integrated chemical looping air separation in large-scale oxy-fuel plants and has been devised particularly though not solely for use in large coal-fired power generating plants.

BACKGROUND OF THE INVENTION

Oxy-fuel combustion along with IGCC and a number of other technology options form a broad portfolio of innovative technology options commonly referred to as Low Emission Coal Technologies (LECTs). Approximately 70% of the future cuts in global greenhouse gas (GHG) emissions are estimated to be due to implementation of LECTs. Among these, oxy-fuel combustion is particularly attractive because of its inherent ability for in-situ separation of $CO_2$. However, oxy-fuel combustion requires oxygen and, thereby, an air separation unit (ASU) to function effectively. Moreover, a number of major issues, chiefly among them the heat transfer limitations, ineffective reactor designs, gas cleaning, and the high energy demand of ASUs, need to be resolved before oxy-fuel technology can be deployed worldwide on a truly commercial basis.

While many of these issues can be effectively resolved given the current level of maturity in the field of combustion and process engineering, reducing the energy footprint and capital cost of ASUs is a more challenging problem requiring a radically new solution.

Oxygen is commonly produced at industrial scales by air separation using cryogenic distillation and adsorption based technologies. Advanced technologies such as membrane separation (e.g. ion-transport membrane, ITM) and in-situ air separation are also being developed for small-volume point-of-use oxygen generation. Generally, cryogenic systems are employed in large-scale production of high-purity oxygen while adsorption systems are employed at the lower end of the production scale and for lower oxygen purities. In cryogenic separation air is liquefied at very low temperatures and, hence, oxygen is selectively removed from the air by distillation. Cryogenic air separation involves a number of key steps, including: (i) air compression; (ii) air liquefaction, and (iii) distillation to separate oxygen from other gases. The process is very effective because it can be accurately controlled by adjusting the pressure and temperature. But cryogenic processes are generally expensive owing to the energy intensity of the air compression process. Considerable efforts have been made in recent years to improve the mechanical and thermodynamic efficiencies of compressors for air separation applications. However, even an ideal compressor with a 100% adiabatic efficiency still requires a significant amount of power to compress large volumes of air to sufficiently high pressures (≈36 bar).

Conventional adsorption methods (e.g. pressure swing adsorption, PSA) of producing oxygen rely on selective physical adsorption of $O_2$ (or $N_2$) on the internal pores of a high surface area adsorbent material. Both carbon and zeolite molecular sieves are commonly used in PSA and vacuum-PSA (VPSA) type air separation plants. Adsorption plants operate in a cyclic manner with the basic steps being adsorption (i.e. $O_2$ or $N_2$ removal from air) and regeneration (i.e. release of $O_2$ or $N_2$ form the saturated adsorbent material). Similar to the cryogenic methods, air compression is a key step in the adsorption based air separation methods and as such the specific power consumptions of PSA and VPSA plants are not much lower than their cryogenic counterparts.

Membranes rely on a barrier film to separate $O_2$ from air. The film allows selective permeation of $O_2$ and can be made from a host of different materials including polysulphone and acetate. More advanced membrane systems, such as ITMs, allow the rapid transfer of oxygen ions, achieving fluxes which are orders of magnitude higher than polymeric membranes. Perovskite membranes (e.g. [La1-xAxCo11-yFeyO3-I] $La_{1-x}A_xCo_{1-y}Fe_yO_{3-I}$) have been also employed in membrane reactors for in-situ oxygen generation. Oxygen in this process though fully reacts with a fuel leaving no excess oxygen for collection as a product. Membranes are generally modular and can be replicated to satisfy the throughput requirements. This however generates a degree of complexity in terms of system integration and installation. Membranes have been in commercial use for several decades but much of their past applications have been in liquid-liquid and liquid-solid separation. The use of membranes for large volumetric gas flow rates, such as those in air separation, has not been demonstrated yet. Membrane systems also suffer from high cost of manufacture.

Other methods for air separation (i.e. non-cryogenic, non-adsorption) have also been developed in the past. The earliest example is the thermal cycling of alkaline manganates for air separation which was demonstrated for a short period in 1866 as a commercial operation. Processes based on absorption/desorption of barium oxide have been also investigated by several researchers. The process was generally difficult to operate since desorption of oxygen had to be carried out under a strong vacuum. A more recent air separation method called "MOLTOX™" (*Air Products and Chemicals, Inc., Allentown, Pa.*) was developed by Erickson in 1980s. The process was carried out by temperature swing absorption of oxygen from air using alkali metal nitrates and nitrites. The process did not lead to any commercial applications due to operational difficulties associated with handling molten salts.

Electrolysis and thermo-chemical cycles for water splitting have been also studied for hydrogen and oxygen production. Over 250 thermo-chemical cycles have been reported in the literature although only a few have proven to be economically feasible. This is not surprising given that the water splitting reaction is thermodynamically feasible at temperatures in excess of 1600° C., requiring a complex and expensive reactor system driven by solar energy. Electrolysis of water is energy intensive too.

Integrated SOFC-E systems (solid oxide fuel cell electrolyser) have been recently proposed to resolve this drawback. The throughput of such systems, though, is very low making them most suitable for small-scale on-site applications.

Given the above background, cryogenic air separation systems appear to be the only practical option for oxy-fuel applications. However, a cryogenic air separation unit with a typical specific power consumption of about 0.4 kWh/[$m^3$ $O_2$] may consume between 10% and 40% of the gross power output of the oxy-fuel plant. Cryogenic ASUs also typically constitute 40% of the total equipment cost or about 14% of the total plant cost.

Clearly there is therefore a need for a more simple and cost effective air separation technology with much smaller energy footprint and lower capital cost than conventional and emerging membrane and/or adsorption based air separation methods.

The present invention uses a chemical looping air separation process fully integrated with the processes of a large-scale oxy-fuel power generation plant to achieve this outcome.

SUMMARY OF THE INVENTION

Accordingly, in one aspect the present invention provides a method of air separation in large-scale oxy-fuel power generation plants of the type having a boiler to generate steam, said method including the steps of recycling flue gas from the boiler through a reduction reactor that is connected in a chemical looping process with an oxidation reactor such that the reduction reactor produces a mixture of oxygen and recycled flue gas, and feeding said mixture back into the boiler.

Preferably, a controlled proportion of the recycled flue gas *from the boiler* is fed through the reduction reactor, with the remaining recycled flue gas being fed directly to the boiler.

In one form of the invention, the chemical looping process includes the steps of passing oxidized metal oxide and heat from the oxidation reactor to the reduction reactor, and passing reduced metal oxide from the reduction reactor to the oxidation reactor.

In a further aspect, the present invention provides apparatus for generating oxygen to be fed into a boiler in a large-scale oxy-fuel power generation plant, said apparatus including a reduction reactor, a flue gas recycling conduit arranged to transfer some of the flue gas emitted in use from the boiler to the reduction reactor, an oxidation reactor connected to the reduction reactor by transfer means arranged to transfer solid particulate material between the reduction reactor and the oxidation reactor, and an outlet conduit arranged to transfer oxygen and recycled flue gas mixture from the reduction reactor back into the boiler.

BRIEF DESCRIPTION OF THE DRAWINGS

Notwithstanding any other forms that may fall within its scope, one preferred form of the invention will now be described by way of example only with reference to the accompanying drawings in which.

PREFERRED EMBODIMENTS OF THE INVENTION

The present invention uses the known chemical looping process in a unique manner to integrate that process into large-scale oxy-fuel type power plants running on organic or fossil based (e.g. coal, gas, oil) fuels.

Figure 1:
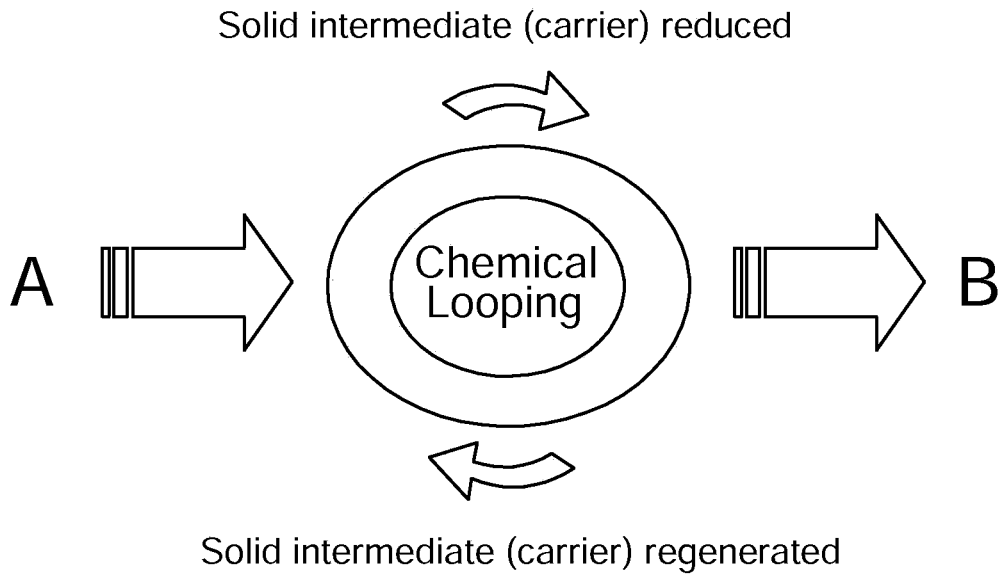
FIG. 1 is a schematic representation of the known chemical looping concept.

As shown schematically in FIG. 1, in the chemical looping process a given chemical reaction (e.g. A+B→C+D) is divided into multiple sub-reactions using solid intermediates (SI) such as metal oxides (MeO) and carbon dioxide scavengers (e.g. CaO). These intermediates are reduced and regenerated in a cyclic fashion through the progress of the sub-reactions. The process is typically carried out by circulation of SI particles via a system of two interconnected reactors (typically fluidised beds) where sub-reactions are executed.

$$A+SI_1 \rightarrow C+SI_2$$

$$B+SI_2 \rightarrow D+SI_1$$

$$\text{Overall: } A+B \rightarrow C+D$$

Chemical looping schemes can be designed in such a manner that the energy and exergy losses of the overall process are minimised while allowing the separation of the undesired products (e.g. $CO_2$) generated from the reactions to be accomplished with ease, yielding an overall efficient and economical process. It is this inherent ability for separation of undesired products, such as $CO_2$, which makes the chemical looping process an invaluable tool in low $CO_2$ emission technologies (e.g. clean coal technologies). Furthermore, the ability to incorporate a diverse range of intermediates (e.g. metal oxides, $CO_2$ scavengers, etc) provides the chemical looping concept with an unprecedented versatility, enabling it to be used in a wide range of applications.

This process is shown schematically in FIG. 1.

The chemical looping process has been used to develop a chemical looping air separation process (CLAS) for standalone production of high purity oxygen.

Figure 2:
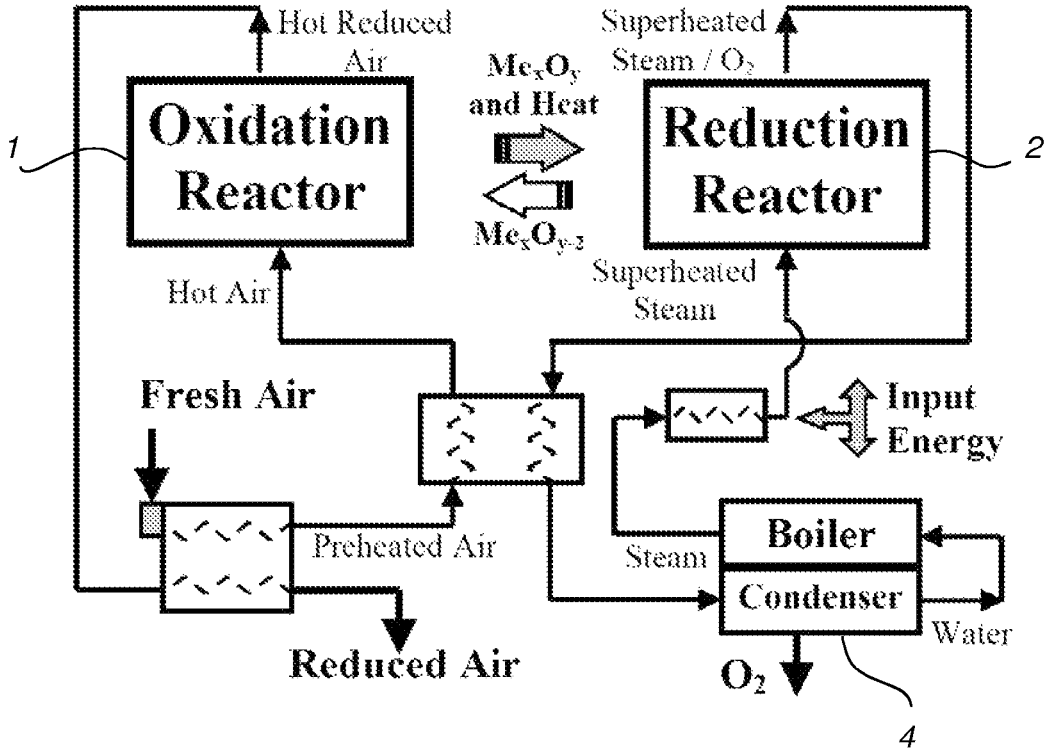
FIG. 2 is a schematic view of a chemical looping air separation process (CLAS) for standalone production of high purity oxygen.
Figure 25A:
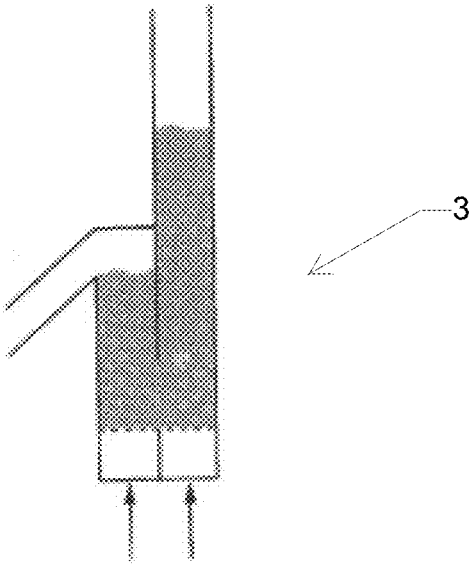
FIG. 25A PRIOR ART
*FIGS. 25A and B show embodiments of a loop seal.*

The CLAS process relies on a chemical principle similar to that used in the chemical looping combustion (CLC) which is commonly carried out in a two-step redox reaction. However, by incorporating the concept of oxygen decoupling into the two-step redox reaction, CLAS is able to separate oxygen from normal air. As FIG. 2 illustrates, the CLAS process works in a cyclic fashion by continuous recirculation of metal oxide particles between a set of two interconnected reactors, where oxidation ($O_2$ coupling, see Eq 1) takes place in an oxidation reactor 1 and reduction ($O_2$ decoupling, see Eq 2) of carrier particles, takes place in a reduction reactor 2. During this cyclic process, oxygen is taken from air in reactor 1, carried by particles and then released in the second reactor 2. The system therefore consists of two reactors linked together through a transfer means in the form of a loop-seal 3, *such as that shown in FIGS. 25A and 25B,* to prevent gas leakage from one reactor to another. Air is fed into the oxidation reactor so that the incoming reduced carrier particles can be regenerated to a higher oxidation state. The regenerated carrier particles, in turn, are transported back to the reduction reactor by the transfer means 3 where oxygen decoupling occurs in the presence of steam. The mixture of steam and oxygen exiting from the reduction reactor is passed through a condenser 4 so that steam can be fully separated from $O_2$. The product oxygen can be then compressed for storage and delivery or directly fed to another process for on-site use.

From an energy efficiency point of view the CLAS process is quite efficient because of its low energy demands. This is partly due to the fact that the theoretical net heat released over reactions (1) and (2) (FIG. 2) is zero. Therefore, in theory the heat transported by the incoming carrier particles into the reduction reactor must be sufficient to support the endothermic reaction (2). Furthermore, under steady state operation much of the heat required for production of steam and pre-heating of air is offset by the heat contents of the superheated steam stream leaving the reduction reactor and the reduced air stream exiting from the oxidiser. As FIG. 2 shows, this is achieved by exchanging: (i) the sensible heat between various streams in a series of heat exchangers, and (ii) the latent heat of phase change in a combined steam condenser/boiler unit. The additional thermal energy required to carry out the CLAS process can be provided by electrical power. Mass and energy balance calculations carried out using the HYSYS® (*Aspentech Canada Corp., Halifax, Nova Scotia, CA*) process simulation *software* package suggest that the heat/power demand for the CLAS process is much lower than that required in cryogenic systems.

Table 1 summarises the results of the heat and mass balance analysis for the $CuO/Cu_2O$ metal oxide system. Since much of the heat required for the CLAS process is provided through waste heat recovery from various parts of the flow-sheet, the net input power ($Q_{net}$) is relatively small. It is evident from Table 1 that $Q_{net}$ consistently decreases as the reaction temperature is increased. The volume of product oxygen also diminishes as the reaction temperature is increased. This can be assigned to the fact that equilibrium constrains impose lower oxygen molar flows through the system as the reaction temperature is increased. It is interesting to note that for the present case the specific power varies between 0.041 and 0.053 $kWh/m^3_n$ with an average value of 0.045 $kWh/m^3_n$. This is about 11% of the specific power of a conventional cryogenic systems (i.e. 0.4 $kWh/m^3_n$). More advanced cryogenic systems due to enter the market by 2012, however, are expected to reach specific powers in the vicinity of 0.3 $kWh/m^3_n$. Such specific powers are still 7 times greater than the average specific power for the CLAS process.

TABLE 1

Summary of HYSYS results for the Cu system for 1 kmole/h of air

| T (° C.) of the Oxidation Reactor | $Q_{net}$ $kW/(kmole/h)_{air}$ | Oxygen Production $m^3/(kmole/h)_{air}$* | Power Demand $(kW/m_n^3)$ |
|---|---|---|---|
| 850 | 0.2724 | 4.89 | 0.053 |
| 900 | 0.2202 | 4.65 | 0.047 |
| 950 | 0.1098 | 2.69 | 0.041 |
| 1000 | 0.0900 | 2.20 | 0.041 |

*At normal conditions (25° C. and 101.3 kPa)

Figure 3:
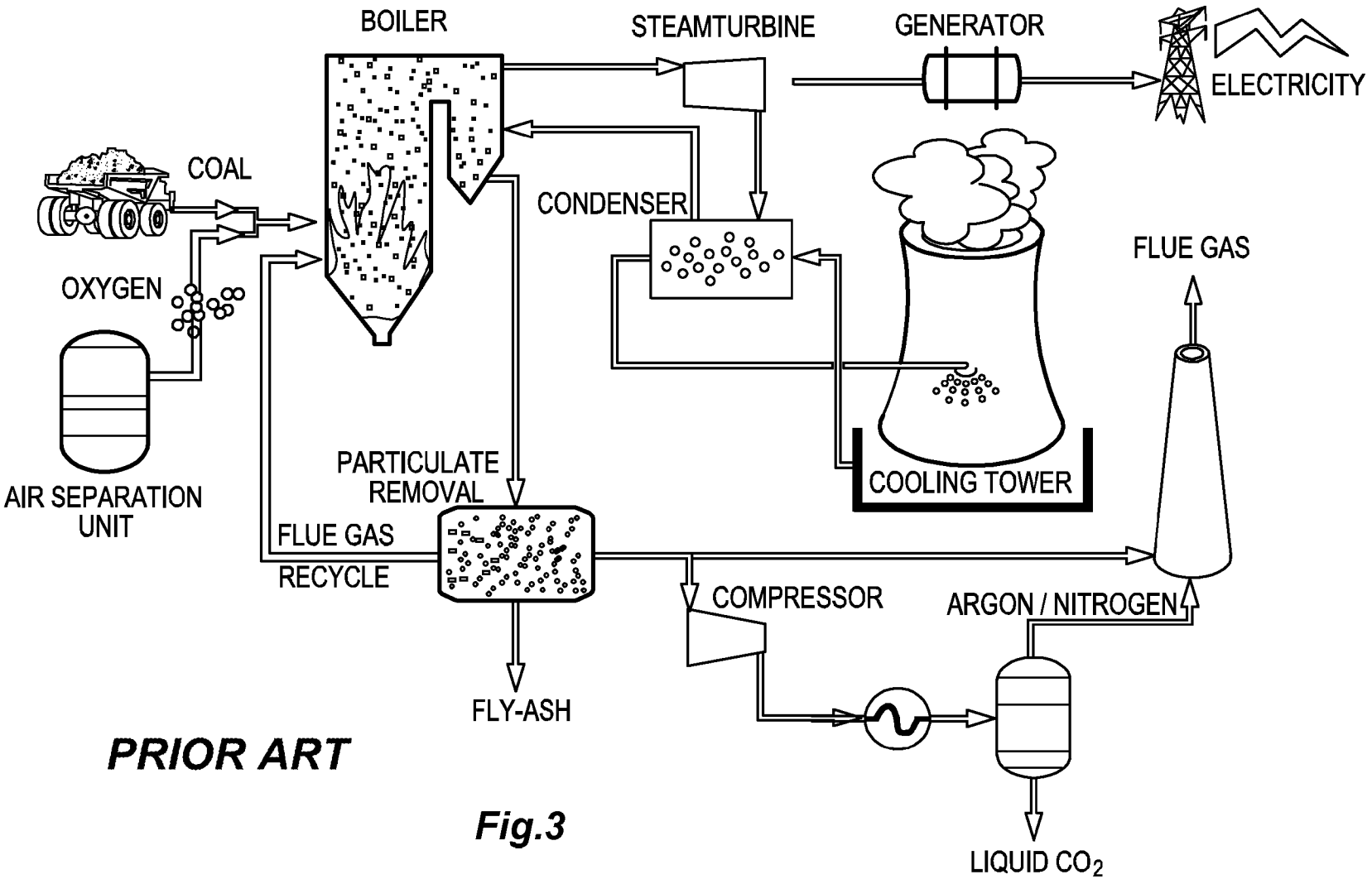
PRIOR ART Fig.3
FIG. 3 is a schematic drawing of a typical oxy-fuel coal-fired power plant.

The present invention uses the principles of the CLAS process described above and uses recycled flue gas from a large-scale oxy-fuel power generation plant rather than steam to allow the process to be integrated into oxy-fuel type power plants running on organic (e.g. biomass) or fossil-based (e.g. coal, gas, oil, etc) fuels. For example consider the conventional oxy-fuel coal-fired power plant shown schematically in FIG. 3. As shown, coal, oxygen (from the ASU) and recycled flue gas are co-fed into the boiler where the mixture is combusted at high temperatures. The heat generated from the combustion process runs a steam cycle which in turn converts the thermal energy into electricity. The use of recycled flue gas here is an important and integral part of the oxy-fuel combustion process because firing pure oxygen in a boiler would result in excessively high flame temperatures which may damage the boiler. Therefore, the mixture must be diluted by mixing with recycled flue gas before it can be fed into the boiler.

Figure 4:
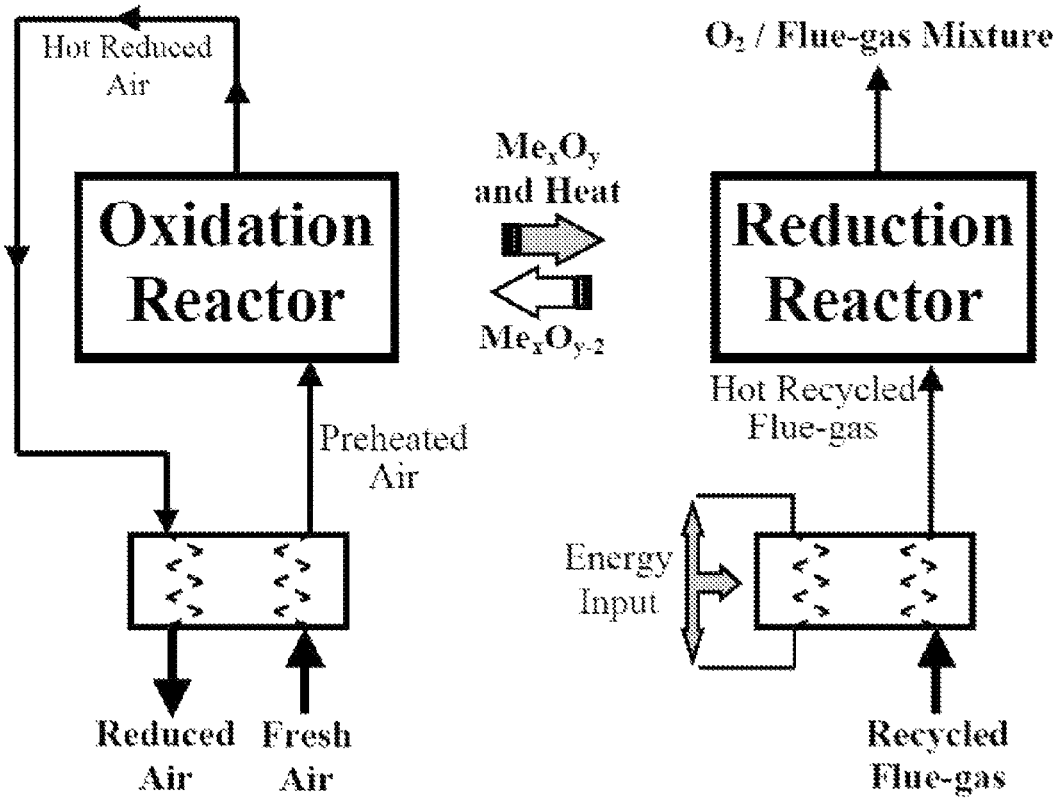
FIG. 4 is a schematic drawing of a chemical looping air separation process adapted to be integrated into a large-scale oxy-fuel coal-fired power plant according to the invention.
Figure 5:
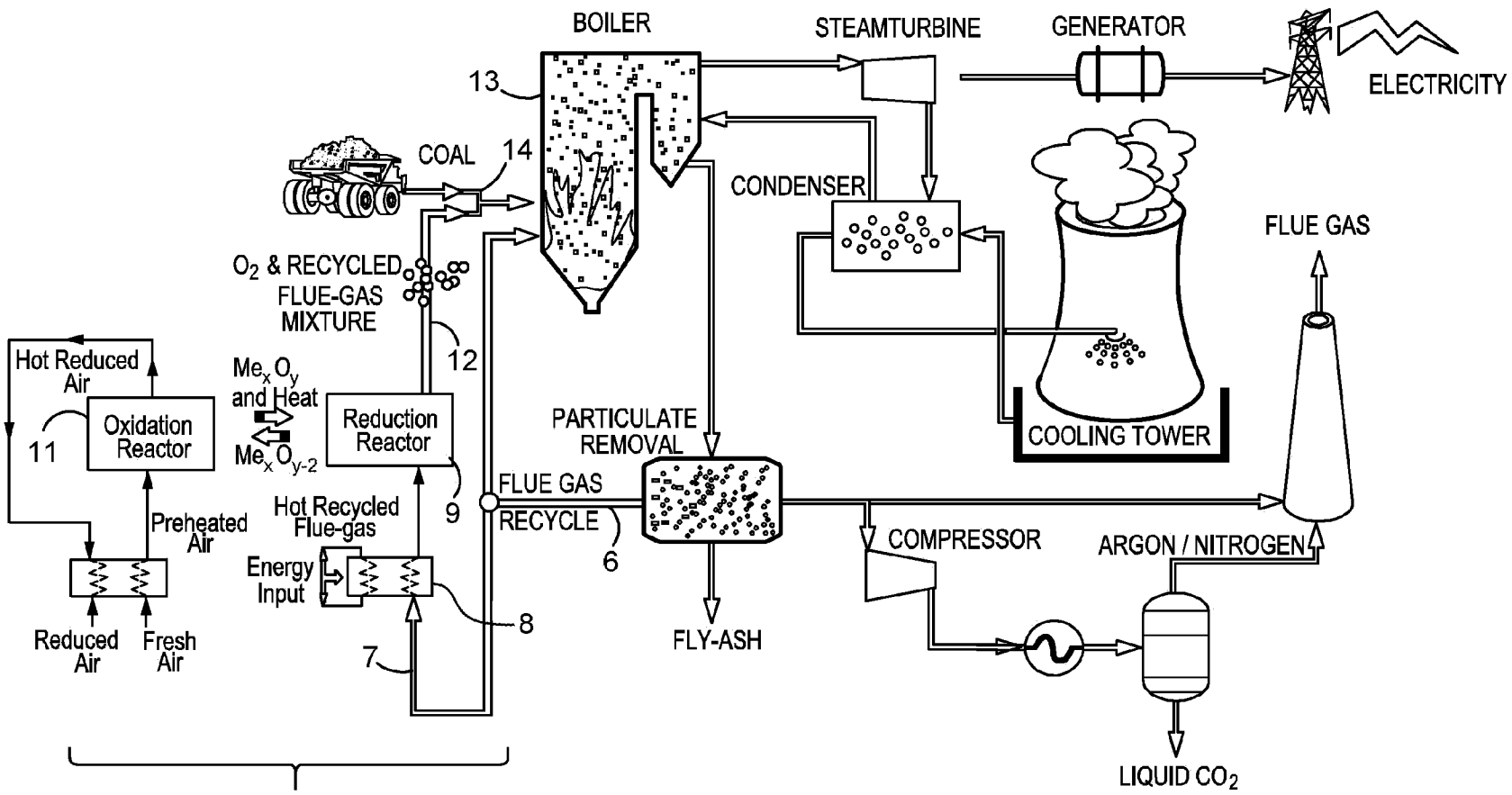
FIG. 5 is a schematic view of an oxy-fuel coal-fired power plant fitted with an integrated chemical looping air separation process according to the invention.

Given the need for recycled flue gas in oxy-fuel combustion and considering the high energy demand for steam generation in a CLAS type process, the present invention employs recycled flue gas rather than steam to provide an Integrated Chemical Looping Air Separation (ICLAS) process during the reduction phase (see FIGS. 4 and 5). This innovative use of the recycled flue gas in the ICLAS process:

- Lowers the overall energy footprint of the air separation process and hence operational costs to levels well below those of the CLAS process.
- Simplifies the hardware required for chemical looping air separation (compare the process flow sheets shown in FIGS. 2 and 4) and thereby reduces the capital cost for the air separation unit in an oxy-fuel power plant.
- Leads to a more effective integration of the ASU with the oxy-fuel plant due to better use of material and energy streams (see FIG. 5).

The working principle of the ICLAS process is similar to that of the CLAS process but the ICLAS process is executed in a distinctly different way. Both CLAS and ICLAS processes work in a cyclic fashion by continuous recirculation of metal oxide particles between a set of two interconnected rectors, where oxidation (Eq 1, $O_2$ coupling) and reduction (Eq 2, $O_2$ decoupling—see FIG. 2) of carrier particles take place, respectively. In both processes air is first fed into the oxidation reactor for separation of oxygen from air through the oxygen coupling process (i.e. regeneration of reduced carrier particles) and then the oxidised (i.e. regenerated) particles are reduced in a reduction reactor to release oxygen via the oxygen decoupling reaction. However, in the ICLAS process the reduction and hence oxygen decoupling process takes place in the presence of recycled flue gas rather than steam. The mixture of oxygen and recycled flue gas exiting the reduction reactor is then directly fed into the boiler of the oxy-fuel plant (FIG. 5). The use of flue gas rather than steam not only eliminates the need for steam generation but also implies that condenser units for separation of $O_2$ from steam are no longer required. This reduces the number of unit operations and thereby capital cost as well as operational and running costs.

As can be seen in FIG. 5, the ICLAS unit shown schematically at 5 takes a portion of the recycled flue gas at 6 and passes that portion through a flue gas recycling conduit 7 through a heater exchanger 8 forming part of the ICLAS unit 5 so that the hot recycled flue gas is fed into the reduction reactor 9.

As previously explained above, solid particulate material is used to transfer $Me_xO_y$ (oxidised metal oxide) and heat from the oxidation reactor 11 via transfer means [10] to the reduction reactor 9 and then to return $Me_xO_{y-2}$ (reduced metal oxide) from the reduction reactor 9 to the oxidation reactor 11.

The process taking place in the reduction reactor 9 as previously described results in a mixture of oxygen and flue gas which is transmitted through an inlet conduit 12 back into the boiler 13. As shown in FIG. 5, the oxygen and recycled flue gas mixture may be combined with the fresh coal feed at 14 before being fed into the boiler.

The successful execution of the ICLAS process largely depends on the ability to exploit the reversible nature of the reactions occurring in both reactors. This can be best accomplished by manipulating the balance between the equilibrium and actual partial pressures (PP) of oxygen over the metal oxide. According to Le Chatelier's principle if a chemical system in equilibrium is disturbed, it will adjust itself to restore equilibrium. In a system with the equilibrium constant $K_p$ and reaction quotient $Q_p$ (this quantity is calculated by the same expression as $K_p$ but using actual conditions) the reaction will shift from products to reactants if $Q_p>K_r$. Conversely, if $Q_p<K_r$, the reaction will proceed from reactants to products. This simple principle is employed here to assure the successful operation of the CLAS process.

Figure 6:
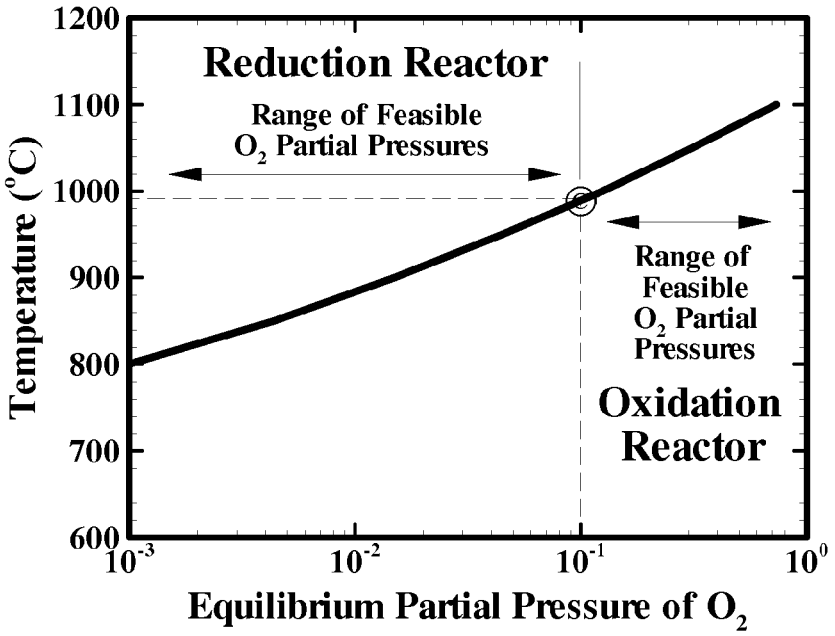
FIG. 6 is a graph showing the link between actual partial pressures and equilibrium partial pressures in the process shown in FIG. 4.

As shown in FIG. 6 for example, for an equilibrium PP (EPP) of 10% corresponding to 1000° C., the actual PP (APP) in the oxidation reactor can be maintained at levels about 12% to ensure that newly regenerated metal oxide carrier particles do not prematurely release their oxygen content before being transported into the reduction reactor. Note that in this case: $(Q_p=APP^{-1}=12^{-1})<(K_p=EPP^{-1}=10^{-1})$.

Likewise, the spontaneous release of oxygen from carrier particles in the reduction reactor can be ensured by keeping the actual PP around 5% which is sufficient to satisfy the condition: $(Q_p=APP=5)<(K_p=EPP=10)$.

The actual PP in the reduction reactor can be easily adjusted by controlling the flow rates of the incoming steam and outgoing steam/$O_2$ mixture. The steam, therefore, is not merely a carrier gas but most importantly a means of controlling the partial pressure of $O_2$ in the reduction reactor. Steam is ideally suited for this task since unlike other carrier gases (e.g. He, $CO_2$) it can be easily separated from $O_2$ by condensation.

The approach outlined above faces a number of challenges. Among these perhaps the most important challenge is the development of effective and robust metal oxide oxygen carriers. Very much like CLC type oxygen carriers, the carriers suitable for the ICLAS process should have a number of desirable properties including:

(i) Excellent reduction/oxidation (redox) properties in terms of reactivity, degree of conversion, selectivity and oxygen transfer capacity
(ii) Good chemical stability to avoid degradation of redox properties during repeated redox cycles
(iii) High mechanical strength so that particle fragmentation and sintering can be avoided
(iv) Low cost
(v) Sound environmental characteristics.

Additionally, the oxygen carriers for the ICLAS process should be able to react reversibly with gaseous oxygen at high temperatures. This additional thermodynamic constraint is a means of differentiating oxygen carriers feasible for the ICLAS process from those only suitable for common redox applications. Numerous studies have been carried out on oxides of transitional metals, such as Fe, Cu, Co, Mn and Ni as potential candidates for redox applications. Thermodynamically, oxides of Cu, Mn and Co are more promising for oxygen decoupling (i.e. ICLAS process) because of their ability to reversibly react with oxygen. But any other metal oxide, solid oxides, or their mixtures with reversible oxygen decoupling properties can be also employed in the ICLAS process.

In order to assess the thermodynamic characteristics of the invention, thermodynamic chemical-equilibrium calculations were carried out on oxides of Cu ($CuO/Cu_2O$), Mn ($Mn_2O_3/Mn_3O_4$) and Co (i.e. $Co_3O_4/CoO$) as well as a 1:1 physically mixed Mn/Co oxide system to ascertain their feasibility for the ICLAS process. The specific objective was to determine the equilibrium partial pressure (EPP) of oxygen for each metal oxide system. As noted earlier, the knowledge of EPP is vital in setting up the operational envelop of the ICLAS process for a given metal oxide system. There are several different approaches for solving chemical-equilibrium problems. The approach adopted here was to minimise the Gibbs free energy of the heterogeneous system under consideration. For a given set of pressure and temperature this was achieved by adjusting species mole numbers so that the Gibbs function (G) defined by Eq (3) is minimised:

$$G = \sum_{i=1}^{I} n_i\left[\bar{g}_i^o(T) + \bar{R}T\ln X_i + \bar{R}T\ln\left(\frac{P}{P^0}\right)\right]. \quad (5)$$

In Eq (3) $\bar{g}_i^0$ is the molar based Gibbs free energy of species i at the reference state, I the total number of species in the heterogeneous mixture of metal oxide and gaseous species, $n_i$ is the mole number of species i, P is pressure, $P^o$ is the pressure at the reference state, $\bar{R}$ is the universal gas constant, T is the temperature of the mixture, and $X_i$ is the mole fraction of species i.

Minimisation of Gibbs function is generally achieved by employing the method of Lagrangian multiplier to ensure that the elemental conservation is met. A variant of this method commonly known as the Element-Potential method[21] was used in the present chemical-equilibrium analysis. The calculations involved solving a total of I+J equations for the I unknown species mole numbers ($n_i$) and J unknown element-potential multipliers ($\lambda_j$). These equations can be expressed using the following general equations in which I and J are the total number of species and elements present in the heterogeneous mixture, respectively:

$$\sum_{j=1}^{J} a_{ji}\lambda_j = \left[\frac{\bar{g}_i^o(T)}{\bar{R}T} + \ln X_i + \ln\left(\frac{P}{P^0}\right)\right], \quad i = 1, \ldots, I. \quad (4)$$

$$\sum_{i=1}^{I} a_{ji}n_i = \tilde{n}_j, \quad j = 1, \ldots, J. \quad (5)$$

where $a_{ji}$ is the number of j-element in species i, and $\tilde{n}_j$ is the element mole number of j-element in the system (i.e. $6.023\times10^{23}$ multiplied by the number of atoms of type/present in the system).

The above approach allows different types of species to be considered including gas phase species, surface species, pure bulk species, and bulk mixtures. The following elements and species were employed in this study:

TABLE 2

Parameters employed in the chemical-equilibrium calculations

| Metal Oxide System | T (° C.) | P (kPa) | Elements | Gas Phase Species | Pure Bulk Species | Bulk Mixture Species |
|---|---|---|---|---|---|---|
| Cu | 650-1100 | 101.3 | Cu, O, N | $O_2$, $N_2$ | CuO, $Cu_2O$ | — |
| Mn | 650-1000 | 101.3 | Mn, O, N | $O_2$, $N_2$ | $Mn_2O_3$, $Mn_3O_4$ | — |
| Co | 650-1000 | 101.3 | Co, O, N | $O_2$, $N_2$ | $Co_3O_4$, CoO | — |
| Mn/Co | 650-950 | 101.3 | Mn, Co, O, N | $O_2$, $N_2$ | — | $Mn_2O_3$, $Mn_3O_4$, $Co_3O_4$, CoO |

Figure 7:
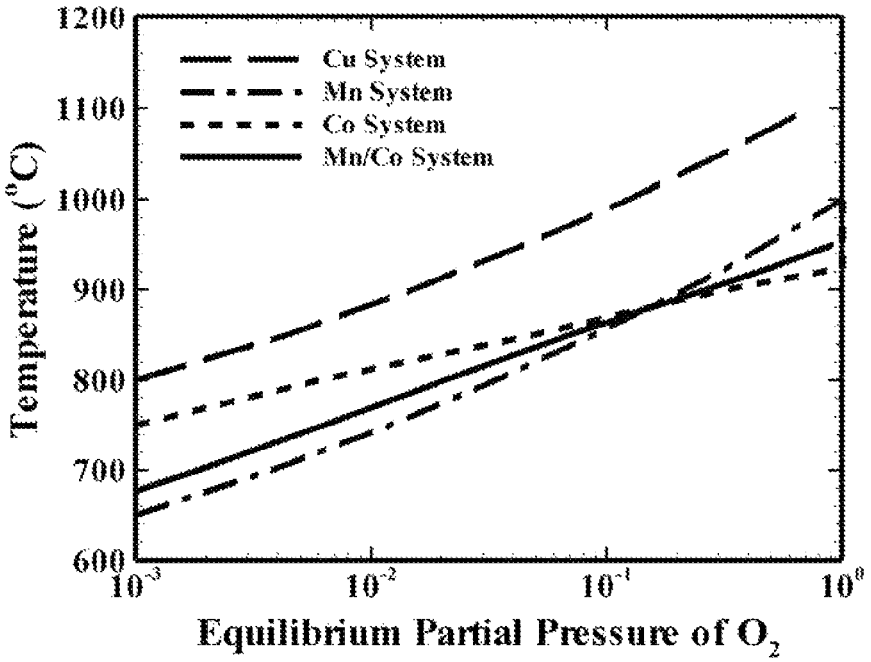
FIG. 7 is a graph showing the results of the chemical equilibrium calculations for the process shown schematically in FIG. 4.

The results of chemical-equilibrium calculations for the metal oxide systems listed in Table 2 are illustrated in FIG. 7 where the equilibrium partial pressure of oxygen (EPP) has been plotted against temperature. As shown in FIG. 7, all three oxide systems exhibit similar and promising trends. The Mn and Co systems, in particular, appear to be more favourable because of their lower equilibrium temperatures which are advantageous from the energy efficiency point of view and avoiding sintering. The Co system has the added advantage of featuring a narrow range of equilibrium temperatures between 750-900° C. Note that narrow range of equilibrium temperature implies that the full range of partial pressures can be covered by limited amount of heating and/or cooling. The minimum equilibrium temperature for the Co system, however, is relatively high and as such it cannot be employed at temperatures below 750° C.

The Mn system, on the other hand, can be used at temperatures as low as 650° C. but its range of equilibrium temperature is quite wide (650-1000° C.) demanding sizable heating and/or cooling load to cover the full range of partial pressures of interest. The separate set of calculations carried out for the 1:1 physically mixed mixture of Mn/Co metal oxide system showed that the drawbacks of the Mn and Co systems can be notably minimised when pure oxides are mixed. As can be seen from FIG. 7, while unlike the Co system the Mn/Co mixture can be used at temperatures around 650° C. it does not possess a temperature range as wide as that of the Mn which is its main advantage.

As noted before the successful execution of the ICLAS process also largely depends on our ability to exploit the reversible nature of the reactions occurring in both reactors. This can be best accomplished by manipulating the balance between the equilibrium and actual partial pressures of oxygen over the metal oxide. According to Le Chatelier's principle if a chemical system in equilibrium is disturbed, it will adjust itself to restore equilibrium. In a system with the equilibrium constant $K_p$ and reaction quotient $Q_p$ (this quantity is calculated by the same expression as $K_p$ but using actual conditions) the reaction will shift from products to reactants if $Q_p>K_r$. Conversely, if $Q_p<K_r$, the reaction will proceed from reactants to products. This simple principle is actively employed in the operation of ICLAS process.

Figure 8:
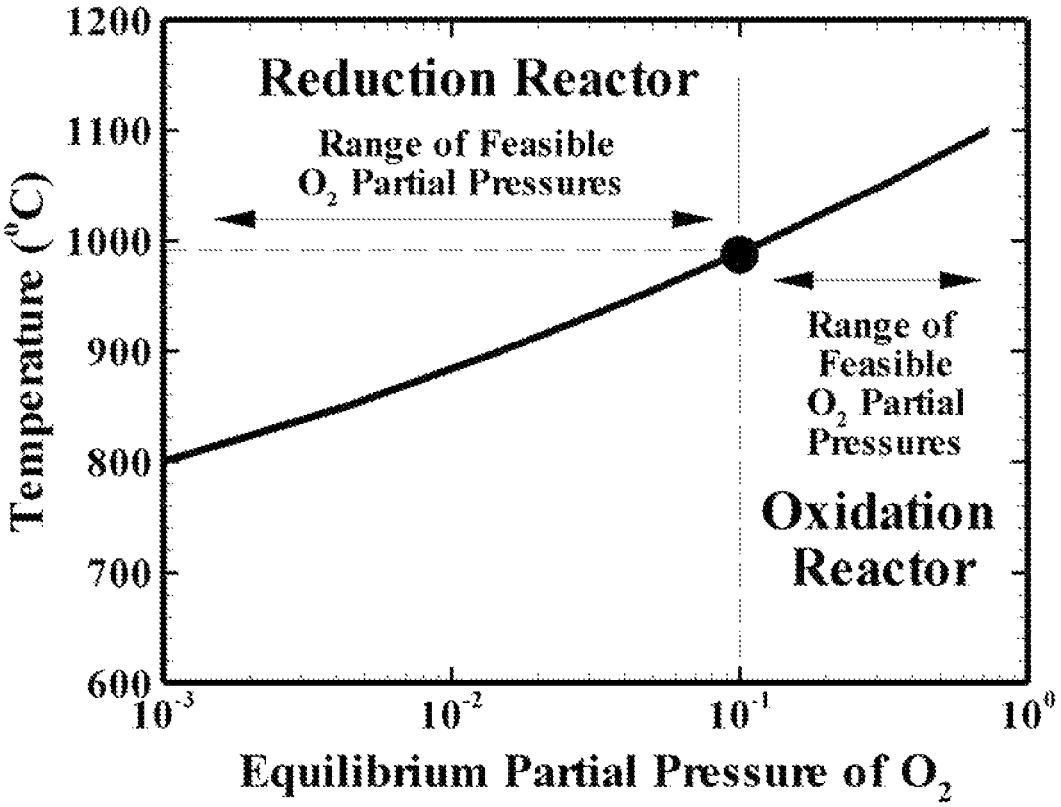
FIG. 8 is a graph showing the determination of the actual partial pressure in the oxidation and reduction reactor outlets of the process shown schematically in FIG. 4.

For example as shown in FIG. 8 for the $CuO/Cu_2O$ system the equilibrium partial pressure (EPP) is 10% at 1000° C. Therefore, the actual partial pressure (APP) in the oxidation reactor outlet can be maintained at levels about 12% to ensure that newly regenerated metal oxide carrier particles do not prematurely release their oxygen content before being transported into the reduction reactor. Note that in this case: $(Q_p=APP^{-1}=12^{-1})<(K_p=EPP^{-1}=10^{-1})$. Likewise, the spontaneous release of oxygen from carrier particles in the reduction reactor can be ensured by keeping the actual partial pressure around 5% which is quite sufficient to satisfy the condition: $(Q_p=APP=5)<(K_p=EPP=10)$. The actual partial pressure in the reduction reactor can be easily adjusted by controlling the flow rates of the incoming recycled flue gas and outgoing $O_2$/flue gas mixture. The flue gas, therefore, is not merely a carrier gas but most importantly a means of controlling the partial pressure of $O_2$ in the reduction reactor.

From the energy efficiency point of view the heat transported by the incoming carrier particles into the reduction reactor is sufficient to support the endothermic oxygen decoupling process. In practice, though, some heat must be supplied to the reduction reactor to compensate for heat losses to the surrounding. However, unlike the CLAS process no additional heat is also required for generation of superheated steam in the ICLAS process. Moreover, much of the required heat duty is offset by utilising the flue gas stream which is already hot. Our preliminary calculations suggest that the heat demand for the ICLAS process is ≈0.03 kWh per cubic meters of oxygen produced (i.e. 0.03 kWh/

$m^3_n$) which is about 30% and 90% less than those of the equivalent CLAS and cryogenic type process, respectively.

The description above refers generally to the recycling of flue gas from the boiler to provide the input to the reduction reactor, and there are many ways of optimising this process and of providing various different oxygen carriers in the chemical looping ICLAS unit. Specific examples are described below, although to avoid complexity, the heat recovery schemes are not shown in the all following examples. In actual operation, heat will be recovered from exhaust (reduced air) and product ($O_2$+steam/$CO_2$) streams which will be utilized for heating up the incoming air and steam/$CO_2$ to the desired operating temperature by number of heat exchangers. The heat can also be used for boiler water heating or vapor absorption chiller or any heat recovery scheme. For simplicity purpose, the extra thermal energy required for the CLAS process is indicated in the examples by the jacket of the reduction reactor. In use, this will be realized by a heat exchanger/jacket. The general heat recovery scheme has been described above.

Recycled flue gas ($CO_2$—rich) stream locations from the oxy-fuel plant:

In the following examples, the term recycled $CO_2$ is used extensively. In the description above, location of the recycled $CO_2$ stream is shown very generally. Recycled $CO_2$ (i.e. flue gas) can be recycled from oxy-fuel thermal power plant from various locations.

Figure 9:
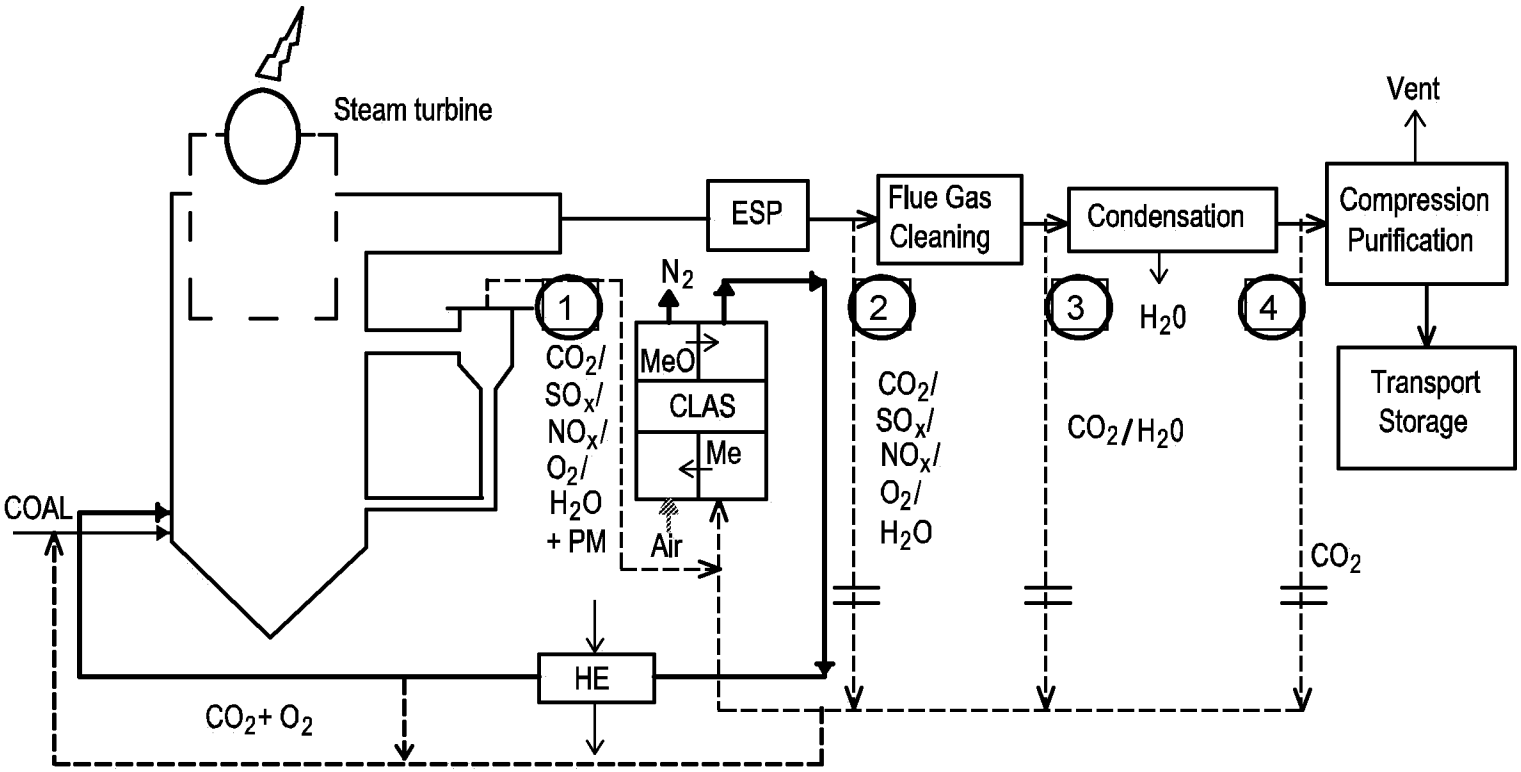
FIG. 9 is a schematic view of alternative recycled flue gas stream locations for CLAS integration with oxy-fuel.

FIG. 9 shows the simplified block diagram of CLAS integration concept with oxy-fuel. Four different locations have been considered from where flue gas ($CO_2$—rich) can be recycled. As per oxy-fuel process terminology, they can be termed as (1) hot (2) warm (3) wet and (4) dry recycling. The concentration of impurities in flue gas will reduce by moving down from option 1 to 4 but at the same time, inlet flue gas temperature to CLAS reduction reactor will decrease due to heat losses which will increase the operating costs for oxygen production. Hot (1) recycling stream will have temperature ranging from 800-1200° C. while the others (2), (3) and (4) will have a temperature of 380° C. after reheating. The detailed schemes are not shown in the following examples to avoid complexity.

Example 1

Chemical looping air separation for oxygen production using different novel oxygen carriers such as $MnO_2/Mn_2O_3$, $Mn_2O_3/Mn_3O_4$, $CoO/Co_3O_4$ and $CuO/Cu_2O$ and mixed metal oxides Metal Oxides In a comprehensive thermodynamic study, four metal oxide systems ($MnO_2/Mn_2O_3$, $Mn_2O_3/Mn_3O_4$, $CoO/Co_3O_4$ and $CuO/Cu_2O$) were found to be most suitable for CLAS.

Figure 10:
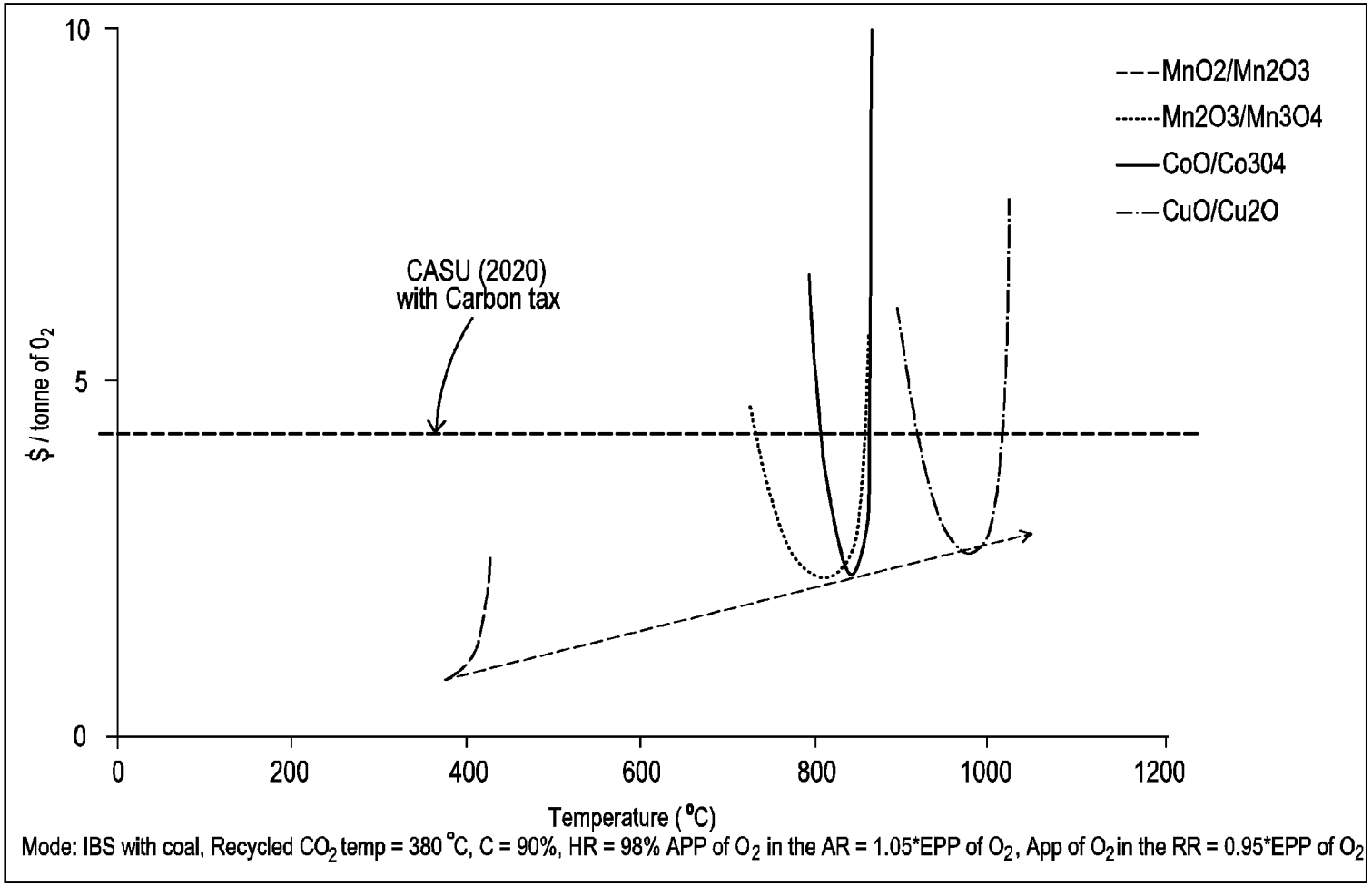
FIG. 10 is a graph showing a comparison of the operating cost for different oxygen carriers.

Operating Norms with the Above Selected Oxygen Carriers:

The operating costs for different oxygen carriers have been obtained in the process simulations and plotted in FIG. 10.

It can be stated that with higher recovery, still CLAS will be economically favorable compare to the advanced CASU by the year 2020 with all the selected oxygen carriers. The order for the lower operating costs will be $MnO_2/Mn_2O_3 < Mn_2O_3/Mn_3O_4 < CoO/Co_3O_4 < CuO/Cu_2O$. However in some initial non-specific experiments, it was found that the reactivity is very slow for the $MnO_2/Mn_2O_3$ system even though it has the lowest operating cost.

Mixed Oxides

Innovatively, use of mixed metal oxides can also be done according to Ellingham diagram which may fulfill the part of the thermal energy required. For example, iron oxides mixed with manganese oxides may be good for the CLAS process. Iron oxide being lower on the Ellingham diagram is difficult to reduce while easy to oxidize in the oxidation/reduction reactor of the CLAS. Oxidation of iron oxide is an exothermic reaction which will consume part of the oxygen available from the air during oxidation or released from the metal oxides during reduction. Oxidation of iron oxide being an exothermic reaction will generate extra thermal energy which can fulfill the partial requirement of the heating of air and recycled steam/$CO_2$. However, preparation of mixed metal oxides, life cycle, mechanical strength, reaction kinetics and inventory are limiting factors for the use of this novel idea. Some specific experiments will be conducted at the University of Newcastle in future to prove the validity of this novel approach.

Example 2

Chemical looping air separation using recycled $CO_2$/steam from oxy-fuel thermal power plant and integration with solar and/or electric heaters.

Figure 11:
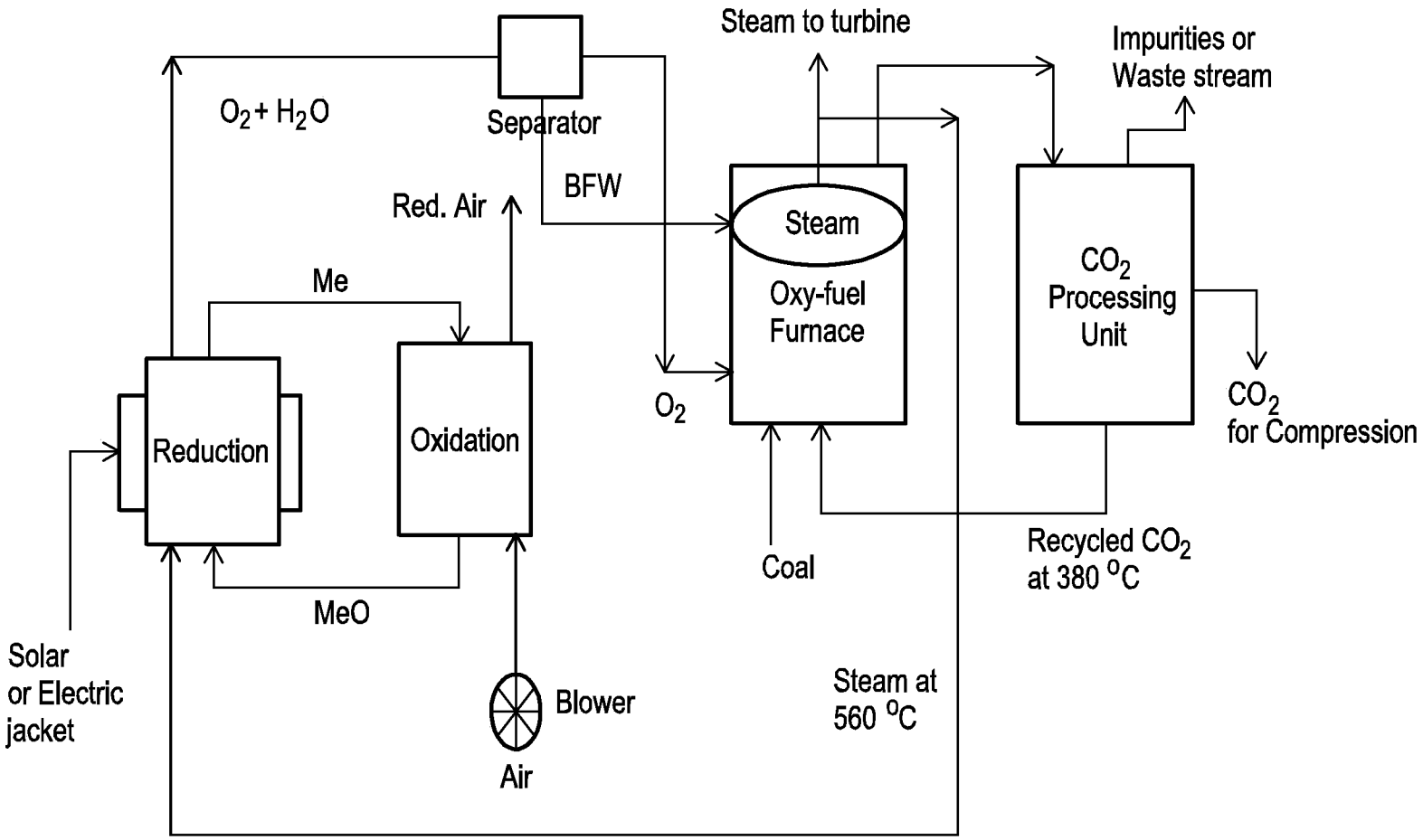
FIG. 11 is a schematic view of oxygen production using steam (CLAS integration with solar or electric heaters)

As shown in FIG. 11, the CLAS process is integrated with steam generated from an oxy-fuel thermal power plant. The steam generated from the oxy-fuel thermal power plant is directly sent to the reduction reactor for the reduction of the oxidized metal oxides coming from the air reactor. The extra heat needed will be supplied using solar or electric heaters.

There are number of difficulties associated with this example as steam needs to be separated from oxygen which adds extra equipment cost for the separator. Importantly, steam has lower mass per unit volume compare to $CO_2$ rich-flue gas and therefore, needs high reactor volumes. Moreover, steam is also an expensive product. And as part of the steam will be utilized for the reduction of metal oxides, power generation capacity may also be reduced considerably. Solar or electric heaters may increase the *Capital Expenditure* (CAPEX) and even sizing of the solar panel and the operating norms with electric heaters may be the limiting factor.

*https://www.investopedia.com/terms/c/capitalexpenditure.asp*

Figure 12:
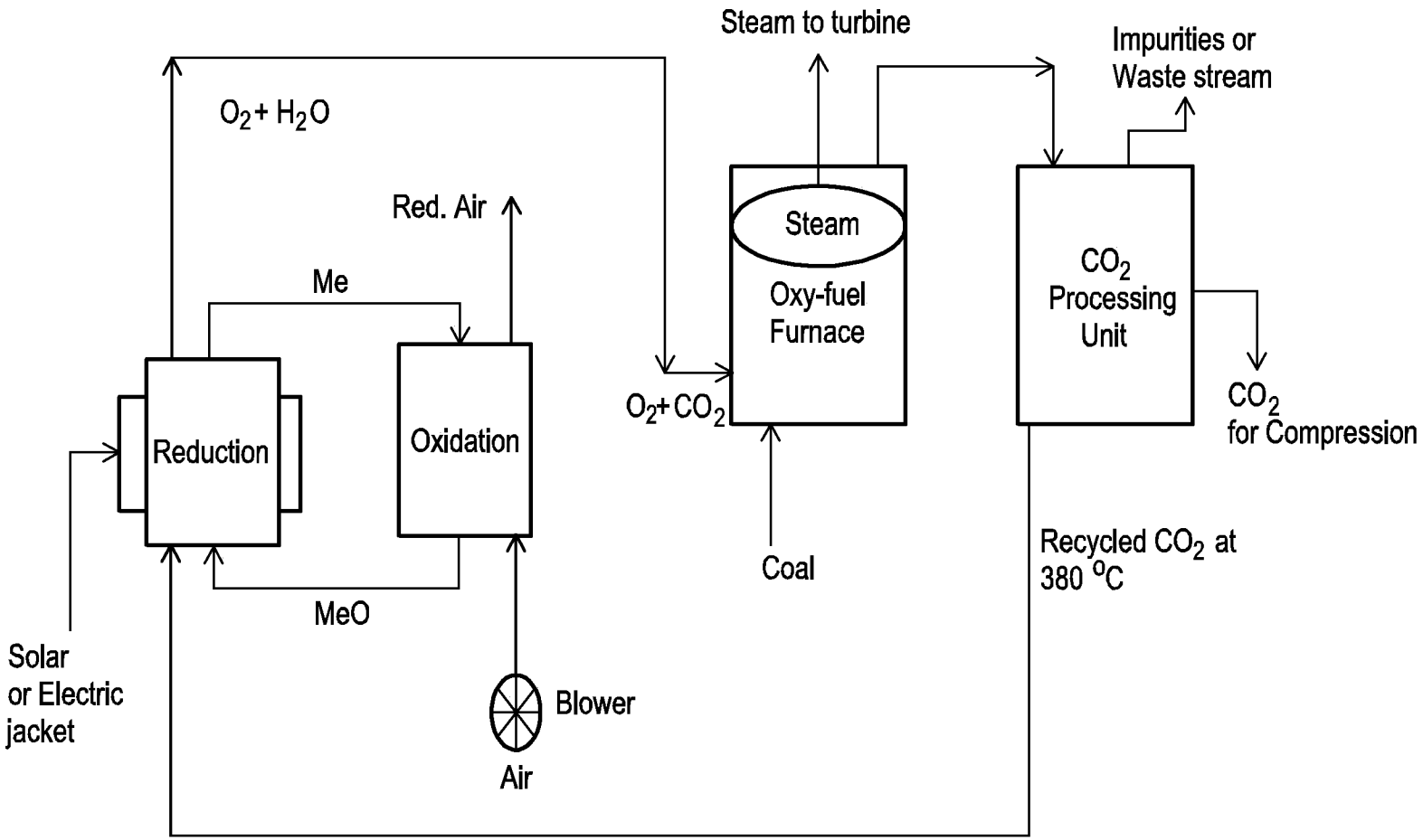
FIG. 12 is a schematic view of oxygen production using recycled $CO_2$ (CLAS integration with solar or electric heaters)

FIG. 12 shows use of recycled $CO_2$ at 380° C. instead of steam for the reduction of metal oxide. One of the advantages is that the oxy-fuel technology needs $CO_2$ to be recycled in the furnace to mainly avoid the high flame temperatures. This recycled $CO_2$ on its way back to the furnace will help reducing metal oxides for oxygen production.

Moreover, removing steam usage eliminates the need of separator. It also helps in efficient pre-mixing of $O_2$ and $CO_2$ before it enters to the burner. Extra heat will be recovered by mode of heat exchangers before it goes into the furnace. The power generation capacity will not be affected and efficiency loss/costs associated with steam generation can be saved.

Example 3

Chemical looping air separation using recycled $CO_2$/steam from oxy-fuel thermal power plant and integration with boiler and gasifier systems.

Figure 13:
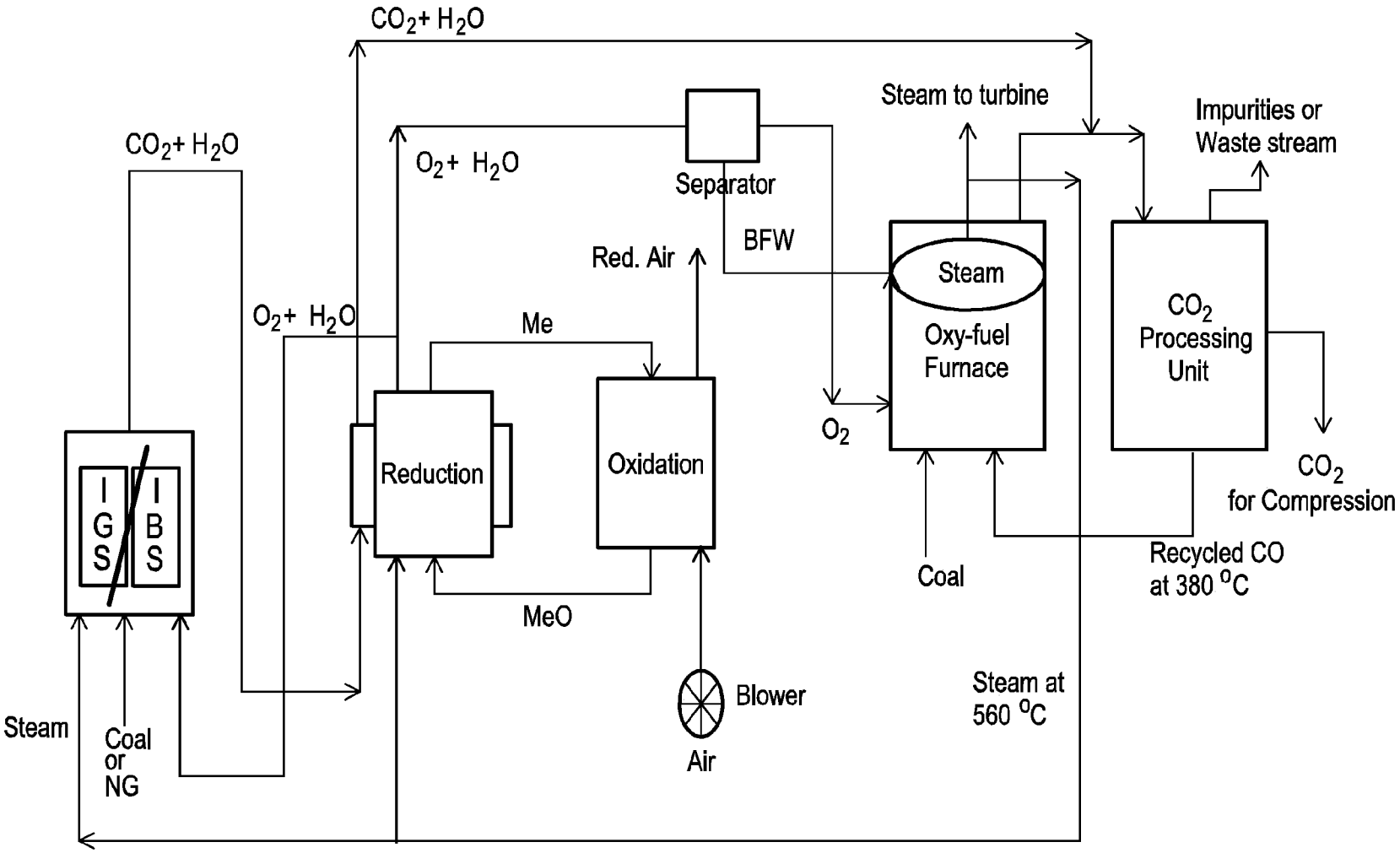
FIG. 13 is a schematic view of oxygen production using steam (CLAS integration with gasifier or boiler systems)

FIG. 13 shows the use of steam as proposed in example 2 with the difference of the use of integrated boiler (IBS) or gasifier (IGS) systems instead of solar/electric heaters for accomplishing the extra thermal energy requirement. The heat generated by conventional fuels such as coal or NG will suffice the extra thermal energy required for heating up air and steam after the major heat recovery from CLAS outlet streams.

The problems associated with this example are the use of expansive steam, reduction in power generation capacity and extra separator requirement.

Figure 14:
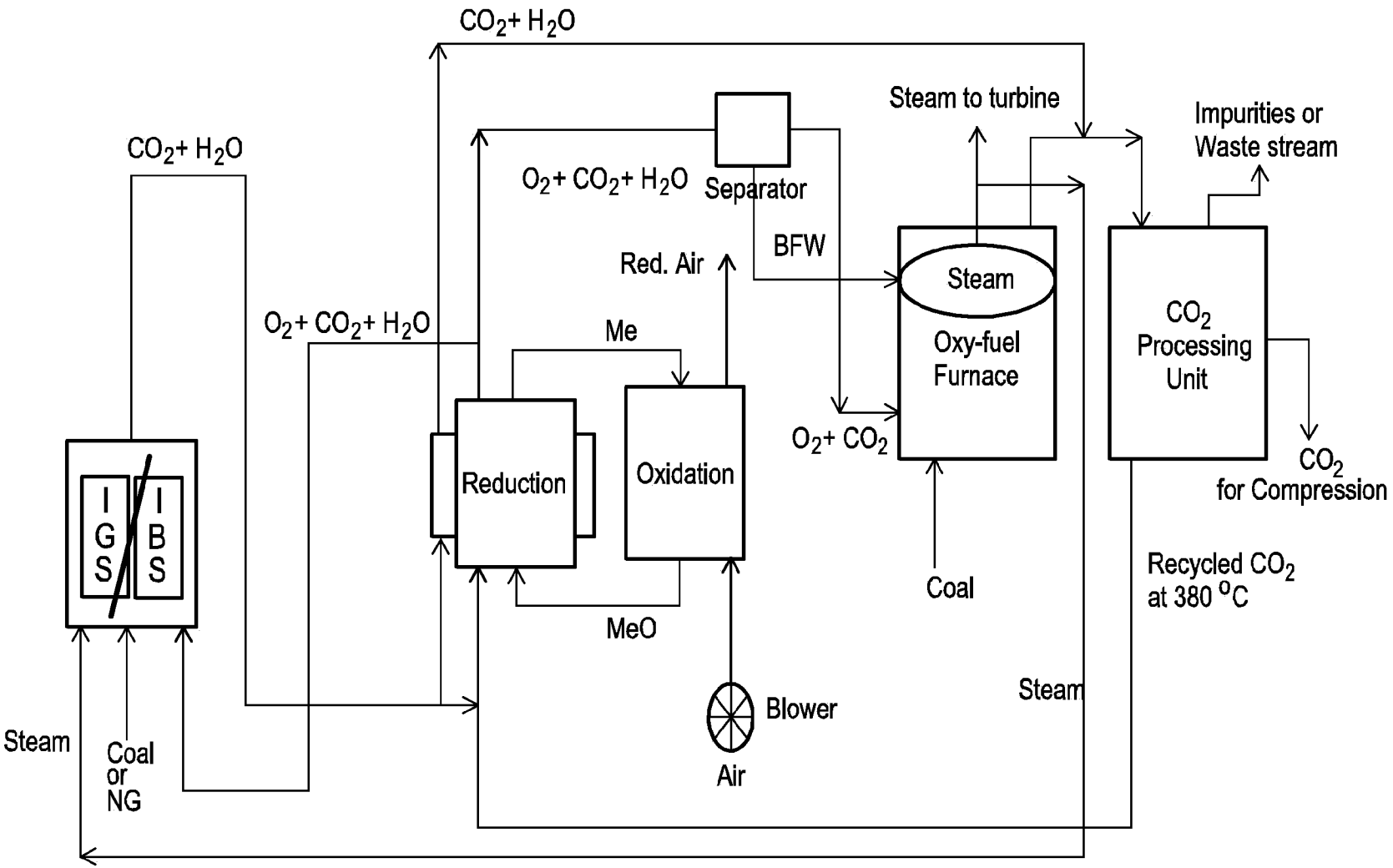
FIG. 14 is a schematic view of oxygen production using recycled $CO_2$ (CLAS integration with gasifier or boiler systems)

The scheme shown in FIG. 14 is similar to FIG. 12 but instead of solar or electric heaters, IGS/IBS are integrated to cater the extra thermal energy needed after possible heat recovery.

Example 4

Figure 15:
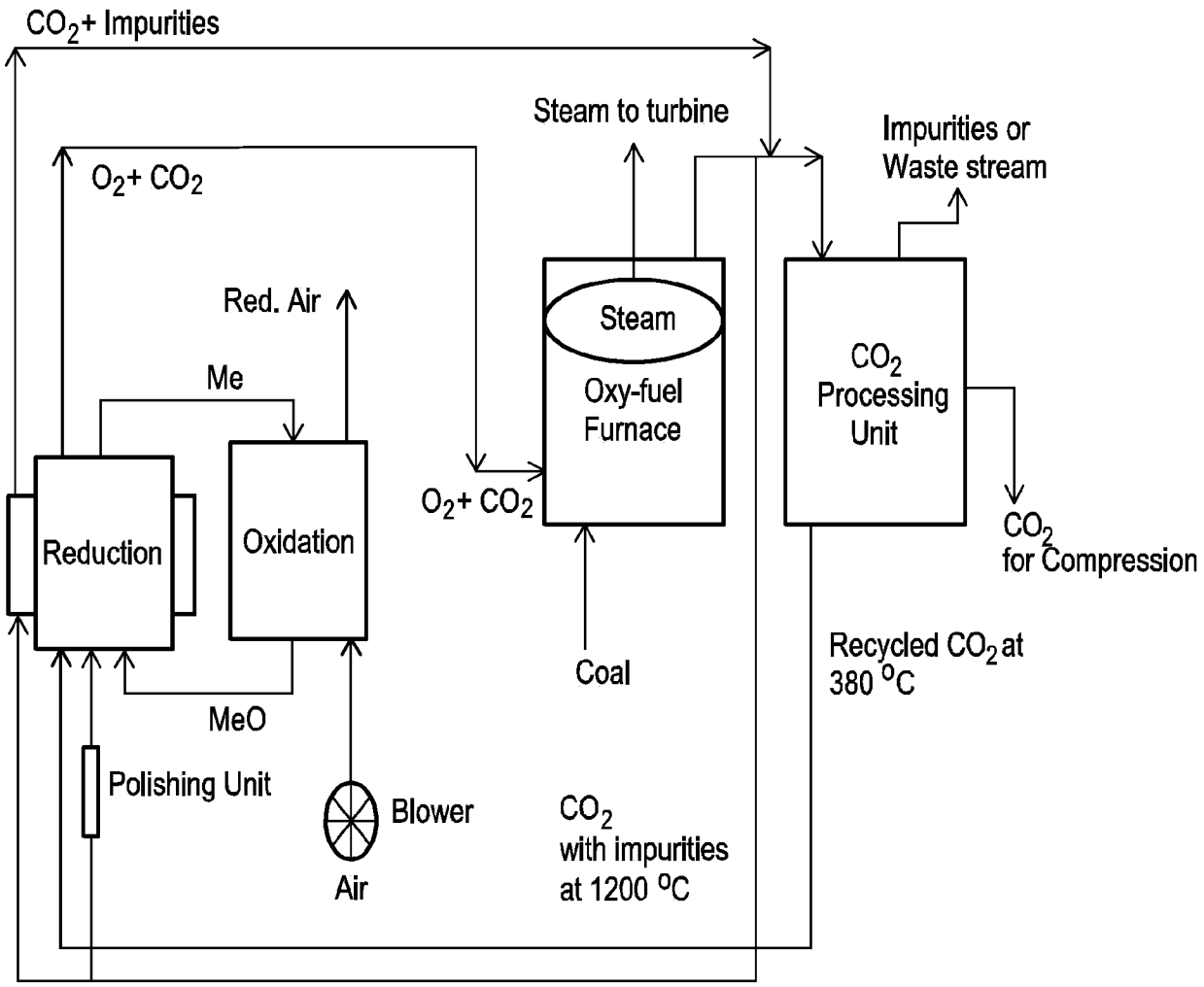
FIG. 15 is a schematic view of oxygen production using recycled $CO_2$ (CLAS integration with oxy-fuel furnace)

Chemical looping air separation using recycled $CO_2$/steam from oxy-fuel thermal power plant and integration with oxy-fuel furnace This example shown in FIG. 15 is similar to example 3 and recycled $CO_2$ at 380° C./steam for the reduction of metal oxides in reduction reactor. To avoid complexity, the steam line is not shown in the FIG. 15.

Additionally, it provides the combustion of extra coal in the oxy-fuel furnace itself (instead of separate IGS/IBS/Solar or electric heating systems) to generate high temperature crude flue gas ($CO_2$ with impurities) which will cater the need for extra thermal energy in direct/indirect ways. For direct crude flue gas option, higher SOx concentration may deteriorate the metal oxide performance and therefore, polishing unit for SOx capturing is recommended.

This example will have higher efficiency and lower capital investment as no extra system (Solar/Electric heaters or IGS/IBS) is needed.

Example 5

Chemical looping air separation using crude recycled $CO_2$ at high temperatures (1200° C.) from oxy-fuel thermal power plant.

Figure 16:
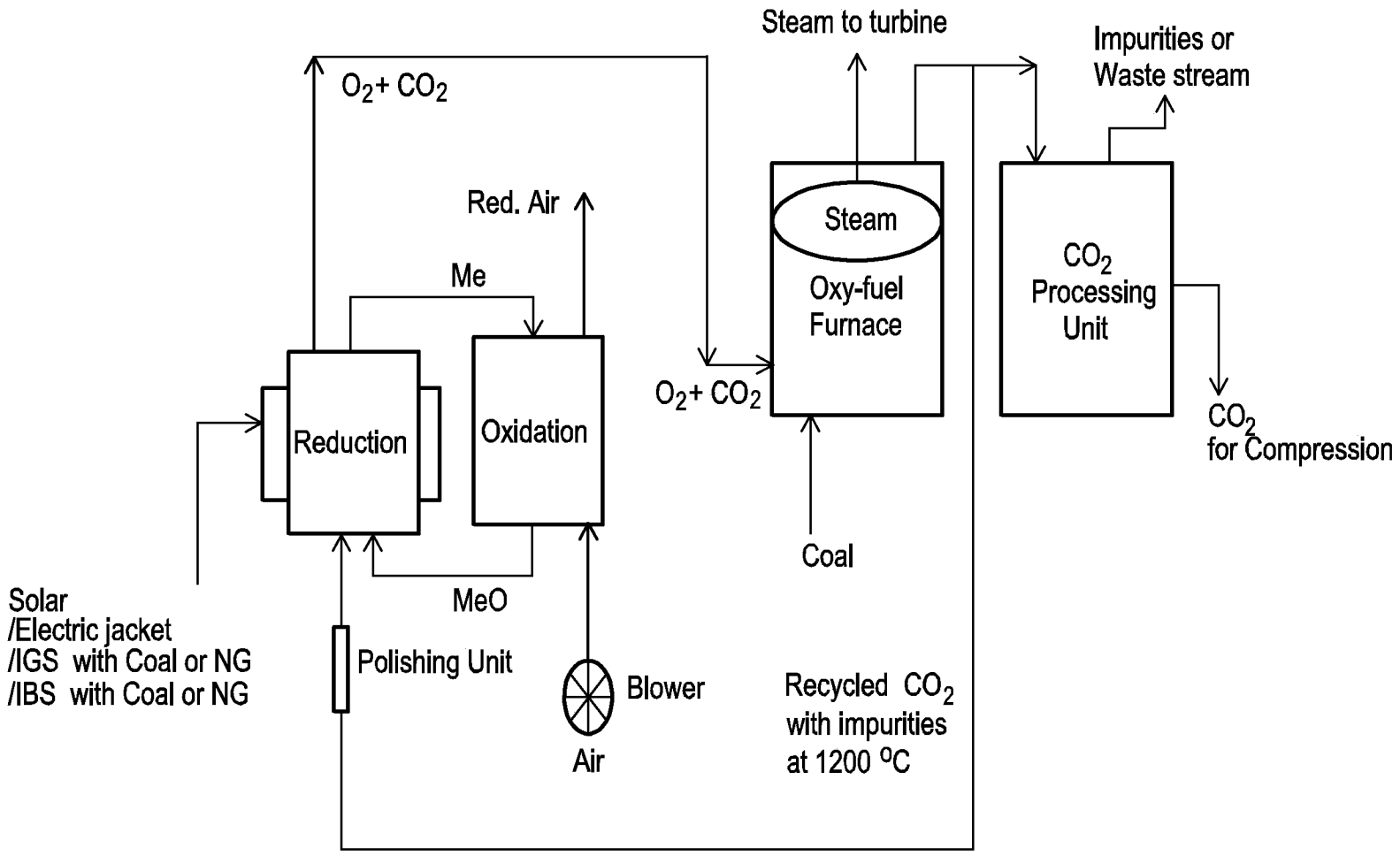
FIG. 16 is a schematic view of oxygen production using recycled $CO_2$ at high temperatures (CLAS integration with oxy-fuel furnace at high temperature)

As shown in FIG. 16, this option eliminates the recycling of $CO_2$ at lower temperature (380° C.) instead it recommends the use of crude flue gas at high temperatures (1200° C.) directly for reduction of the metal oxides. It also suggests the use of polishing unit for capturing the sulfur which may degrade the metal oxides. However, the polishing unit requirement and sizing can only be recommended after systematic investigations on the effect of $SO_x$ on the metal oxides used as oxygen carriers in the CLAS process. Effect of $NO_x$ and moisture also needs to be studied in detail.

Example 6

Temperature Swing Chemical looping air separation using recycled $CO_2$/steam from oxy-fuel thermal power plant and any of the above modes of integration.

Figure 17:
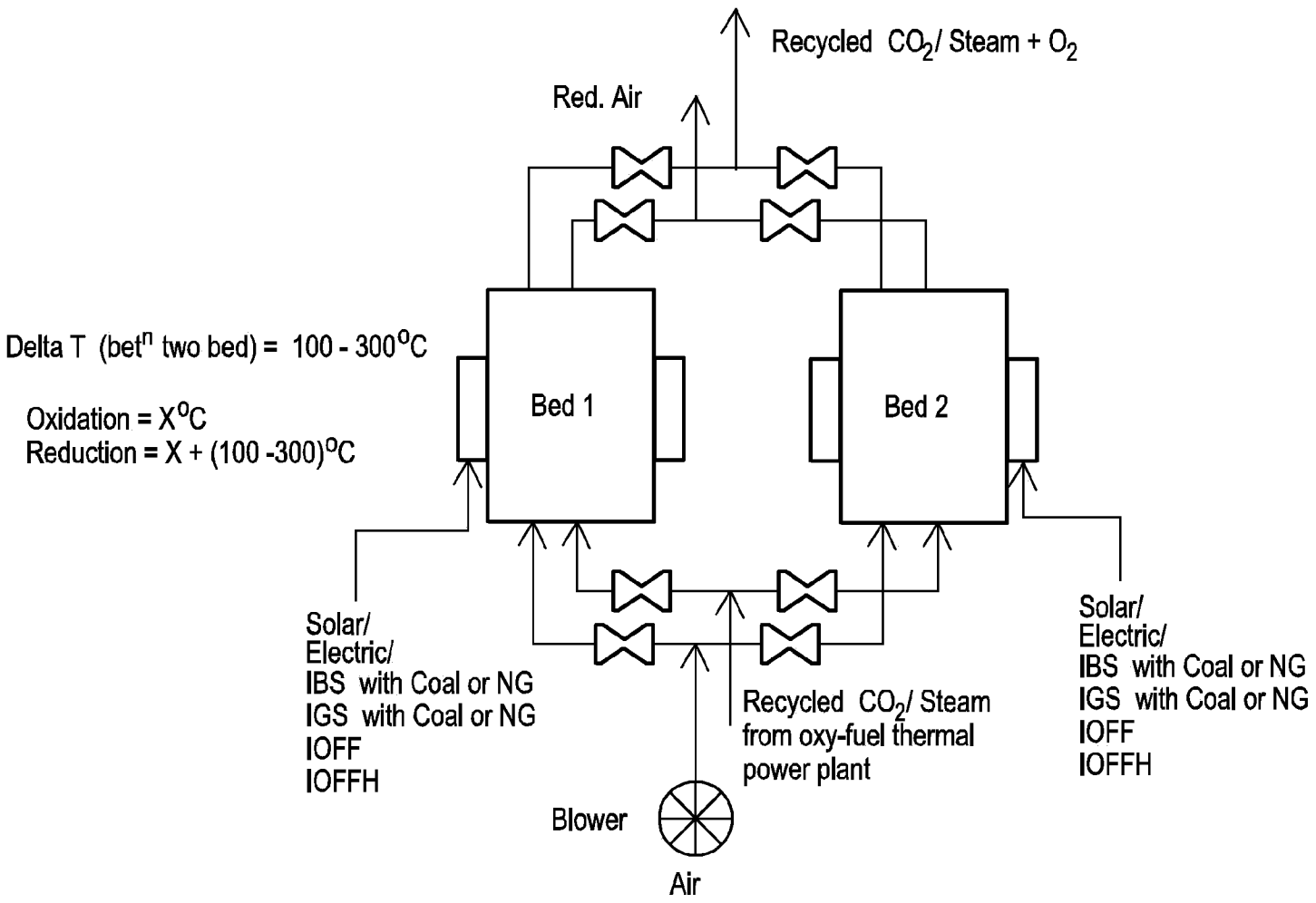
FIG. 17 is a schematic view of a temperature swing CLAS process.
Figure 18:
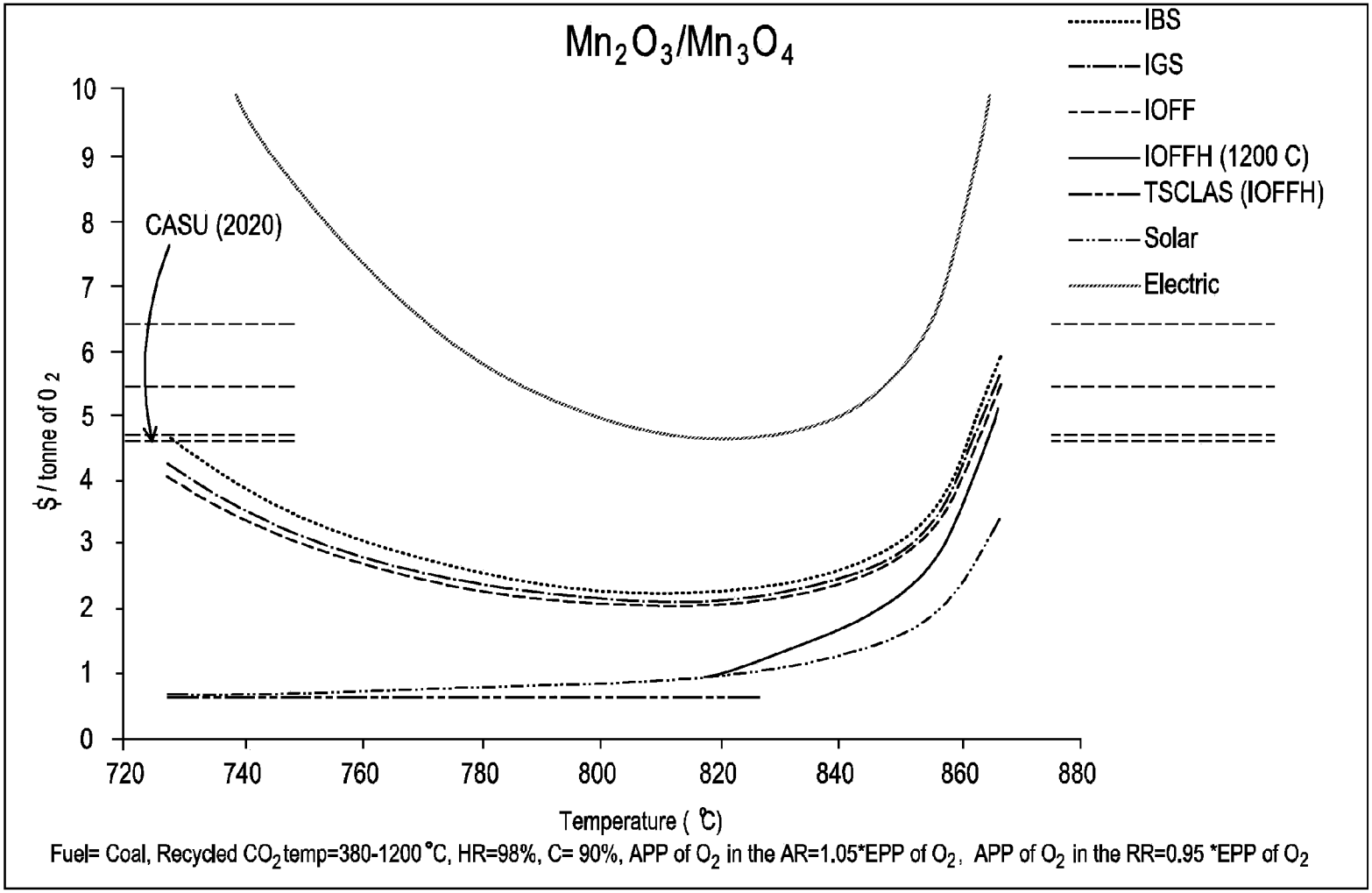
FIG. 18 is a graph showing the effect of different integration modes on the operating cost for CLAS.

One more option as fixed/fluidized bed temperature swing chemical looping air separation (TSCLAS) is also considered. The simple schematic is shown in FIG. 17. The reason behind selecting the temperature swing is that unlike chemical looping combustion (CLC) in CLAS oxidation at lower temperature is much favorable due to lower EPP of $O_2$. In contrast, reduction at high temperature will reduce the requirement of steam/$CO_2$. Therefore, it will have low temperature oxidation and low steam requirement compare to normal CLAS. FIG. 18 clearly indicates that TSCLAS with IOFFH integration mode will be parked at the bottom in the costing chart. However, issues related to TSCLAS such as uniform temperature distribution though out bed, heat and mass transfer, hot spots in the bed, chemical conversion, channeling, heat recovery and maintenance are still to be assessed further. Temperature swing may not be suitable due to short reaction times in the reactors as well as heat recovery problems.

Quantitative Comparison for *Operating Expenditure* (OPEX) for CLAS for Different Integration Modes: *https://www.investopedia.com/terms/o/operating_expense.asp*

Quantitative comparisons have been made for all the possible examples set out above to integrate the CLAS with oxy-fuel thermal power plant. The example is given for $Mn_2O_3/Mn_3O_4$ oxygen carriers in FIG. 18. It can be seen that even electrical heater integration with CLAS using recycled $CO_2$ runs more efficiently than current CASU and membrane norms. The integrated boiler and gasifier systems with coal works better than the CASU norms predicted for the year 2020.

The two integration modes with the oxy-fuel furnace (IOFF and *Integrated Oxy Fuel Furnace High Temperature* (IOFFH)) and solar system work even lower than the other proposed integrated systems. However, practical feasibility of the IOFF and IOFFH systems needs to be evaluated. Additionally the sizing, availability and cost for the solar heaters will be critical factors need to be evaluated further.

FIG. 18 clearly indicates that TSCLAS with IOFFH integration mode will be parked at the bottom in the costing chart. However, issues related to fixed beds such as chemical conversion, channeling and maintenance are still to be assessed further. Moreover, temperature swing may not be suitable due to short reaction times in the reactors as well as heat recovery problems.

Figure 19:
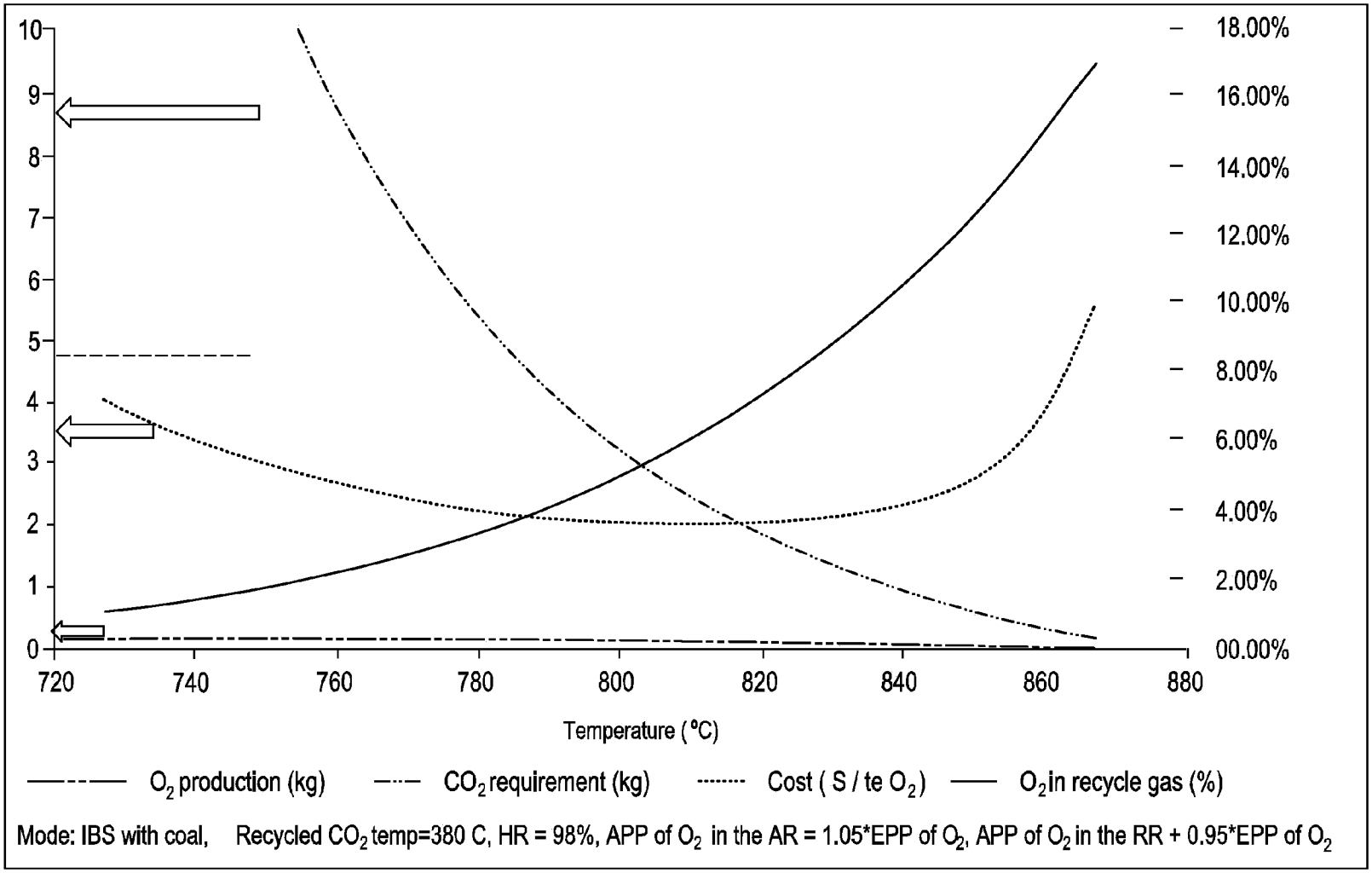
FIG. 19 is a graph showing the $O_2$% in the recycled product gas streams

The CLAS designed with only recycled $CO_2$ may have limitations in producing the desired product streams (30% $O_2$ in the recycled flue gas) for oxy-fuel furnace. As shown in FIG. 19, the cost for producing 16% $O_2$ in the recycled product gas stream will be nearly as same as the operating cost for CASU (2020). Two final examples are therefore suggested to overcome this limitation.

Example 7

Hybrid CLAS/CASU system for Oxy-fuel thermal power plant

Figure 20:
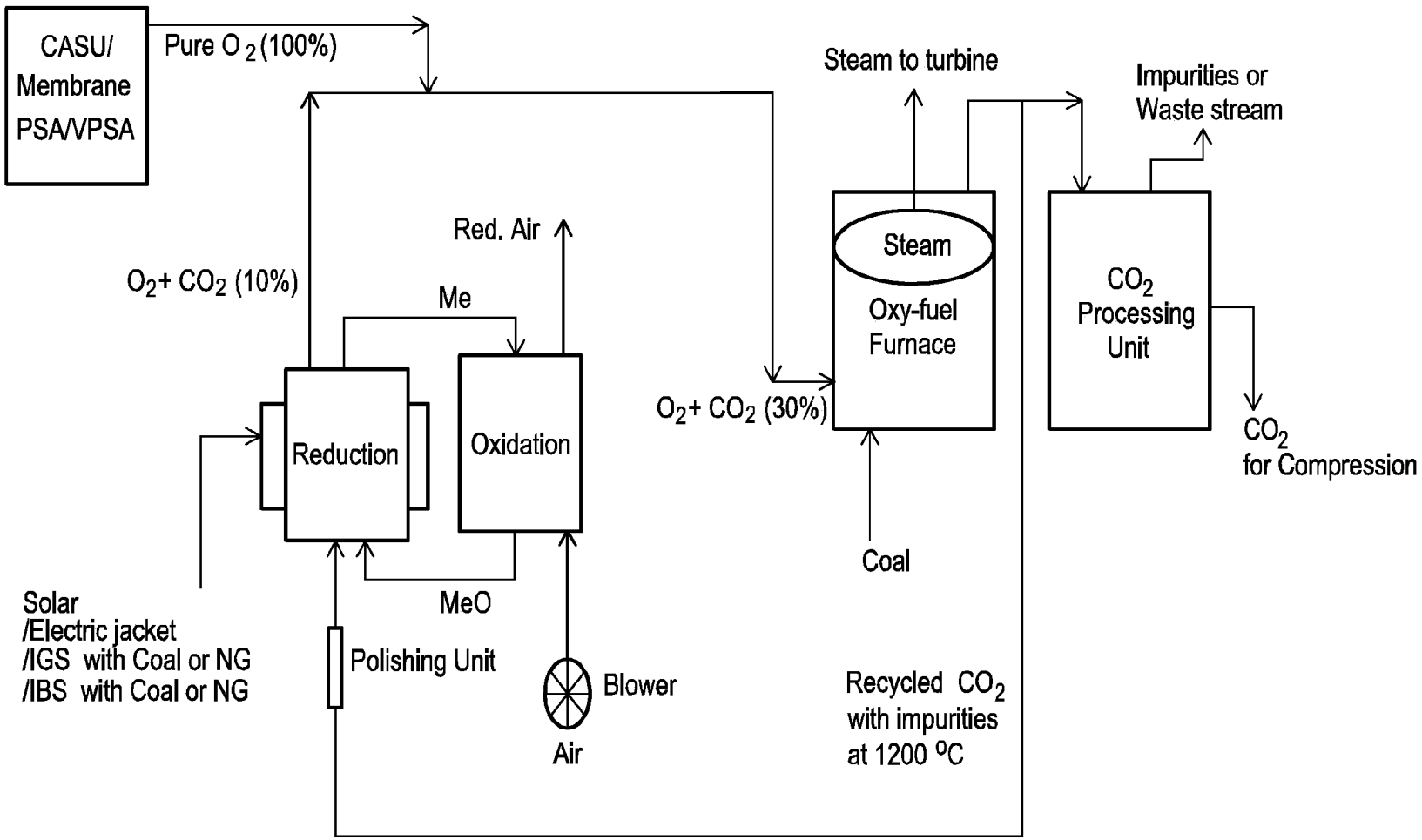
FIG. 20 is a schematic view of a hybrid CLAS/*Cryogenic Air Separation Unit* (CASU) system for oxy-fuel thermal power plant.

It has been recommended here to produce 10% $O_2$ in CLAS product stream with recycled $CO_2$ and increase the $O_2$ concentration by adding pure $O_2$ from CASU as shown in FIG. 20. This option will be good for retrofitting. Secondly, such hybrid design can reduce the operating costs considerably (around 30%) compare to the CASU alone as approximately 35% of the $O_2$ will be produced by CLAS (IOFFH) or TSCLAS (IOFFH) at much lower operating cost. Moreover, CLAS system demonstration unit is still not in operation and will also have number of issues in terms of large scale fluidization. Therefore, smaller size CLAS may be more feasible in the initial phase.

Example 8

CLAS hybrid steam/recycled $CO_2$ system for Oxy-fuel thermal power plant

Figure 21:
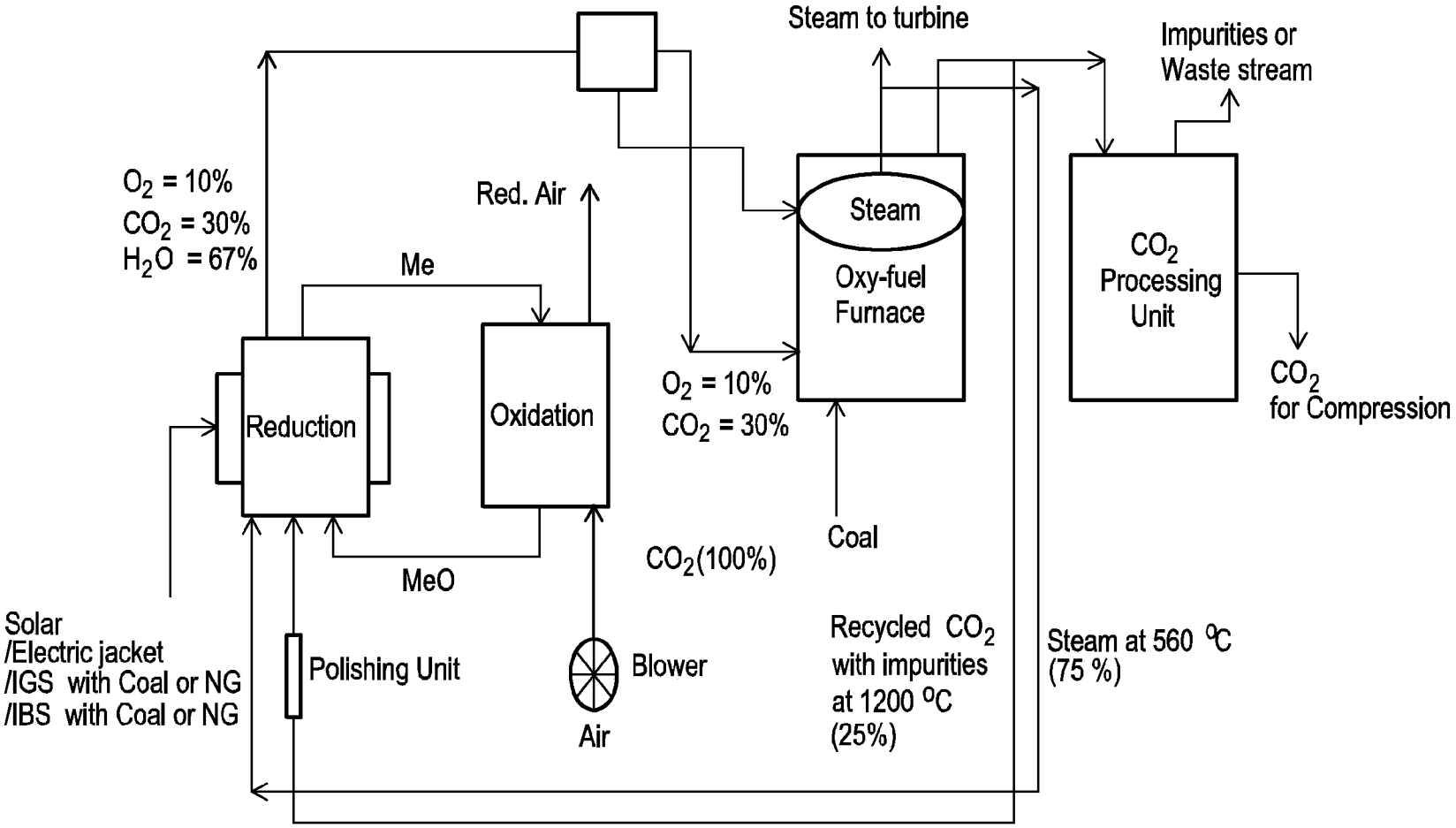
FIG. 21 is a schematic view of a CLAS hybrid steam/recycled $CO_2$ system for oxy-fuel thermal power plant.

In this option, steam is used in the reduction reactor along with $CO_2$ to dilute the $O_2/CO_2$ ratio in the product stream as shown in FIG. 21.

The feasible scaling of the CLAS is still not clear. However for retrofitting, the power generation capacity in this case will be compromised as part of the steam will be generated and used for CLAS. So, this option can be designed for new thermal power plants wherein extra capacity steam generation capacity needs to be accounted from the design stage. The operating costs may increase little compare to other CLAS with all suggested integration modes but it will be definitely lower in terms of CPAEX and OPEX.

ICLAS Reactor Design

Figure 22:
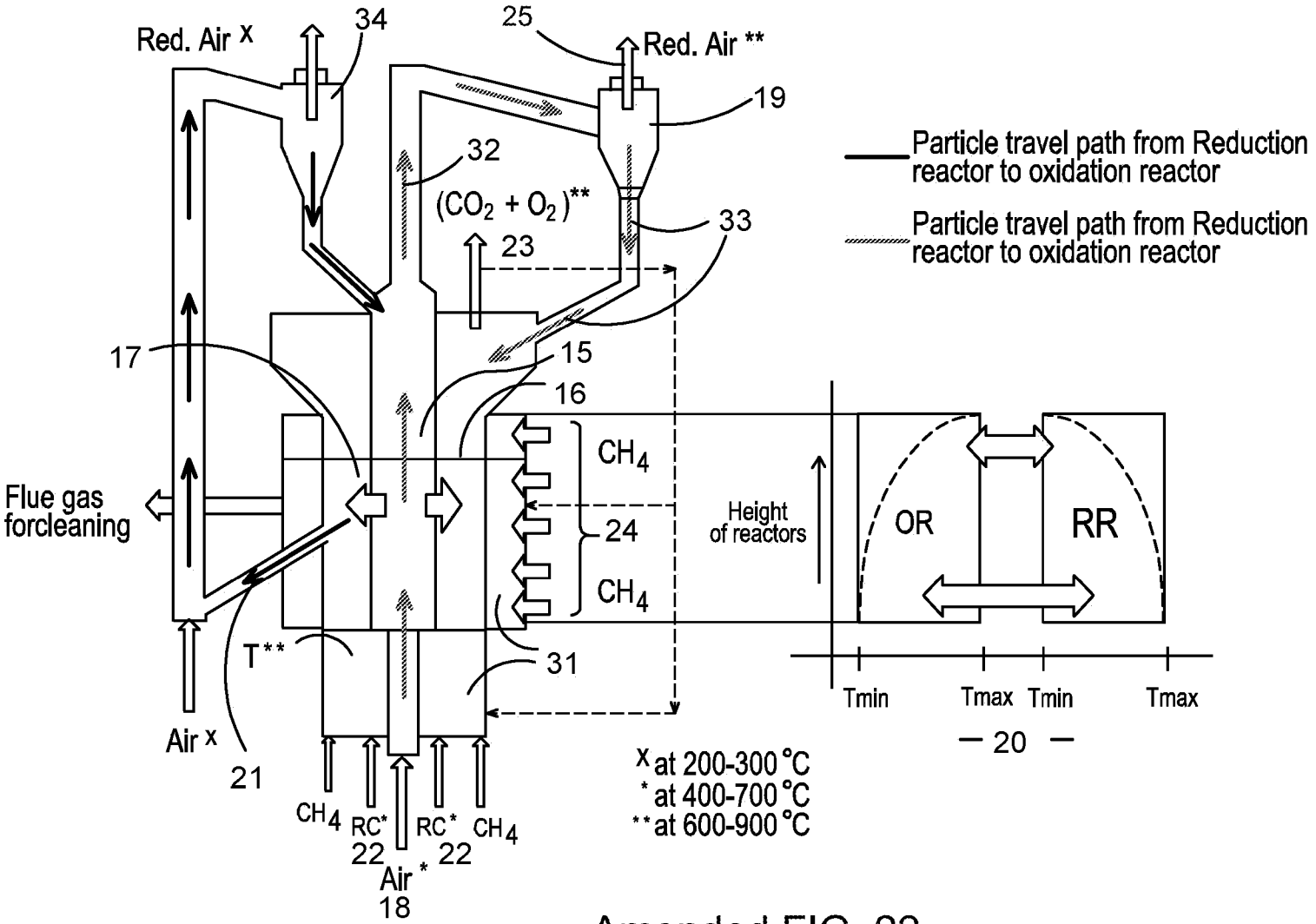
FIG. 22 is a schematic view of a double pipe reactor design for isothermal ICLAS.
Figure 23:
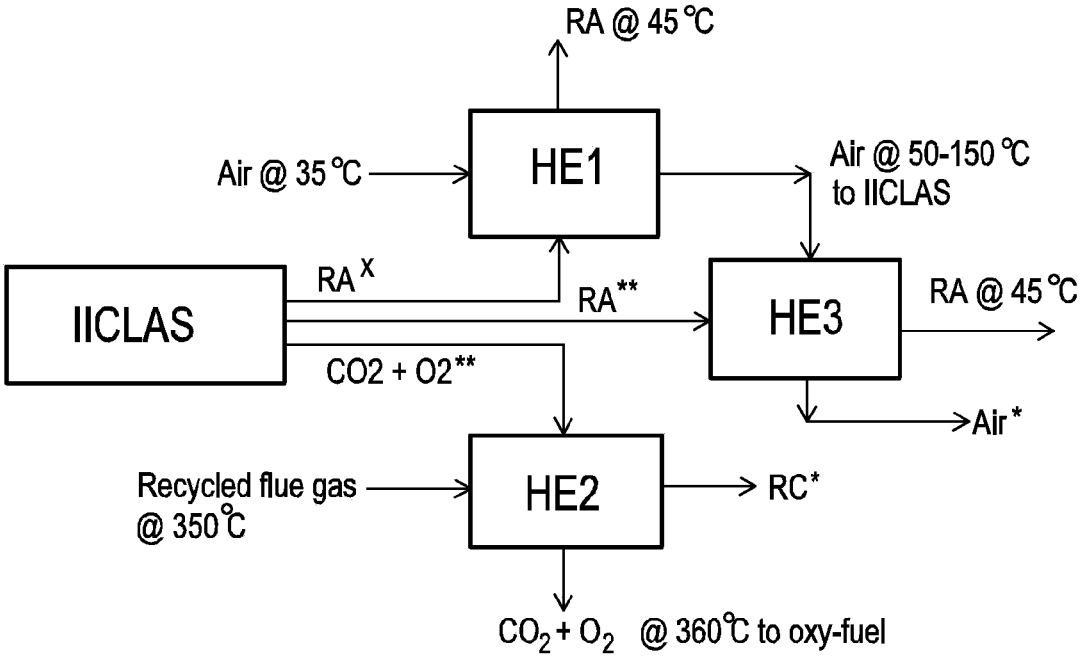
FIG. 23 is a schematic drawing of the process in the reactor shown in FIG. 22.

One particularly effective manner of providing the ICLAS unit shown at 5 in FIG. 5 is to utilise a double pipe reactor design for isothermal ICLAS (IICLAS) as shown in FIG. 22 (*also shown schematically in FIG. 23, showing various reduced air (RA) streams, distinguished from one another with superscript "x", "**" and without superscript and recycled flue gas streams (RC), distinguished from one another with superscript "*" and no superscript, and the arrangement of heat exchangers 1-3, designated HE1, HE2 and HE3, respectively.*) Here the oxygen reactor (OR) 15 is an inner pipe within the reduction reactor (RR) 16 as an outer pipe allowing efficient heat transfer as shown at 17.

Air introduced at 18 passes upwardly where it is heated by the combustors 31 to a desired temperature and then passes through the inner pipe oxidation reactor 15 where it oxidises the oxygen carrier particles. The oxidised carrier particles are transported upwardly along path 32 into cyclone 19 where reduced air exits the cyclone at 20. The oxidised carrier particles are then transferred to the reduction reactor 15 as shown at 33. Recycled flue gas (RC) introduced at 22 along with added combustion gases from the combustors 31 will reduce the oxidized oxygen carrier particles. The reduced oxygen carrier particles are then transported through conduit 21 through cyclone 34 back to the oxidation reactor 15.

Two combustors 31 (i.e. horizontal and vertical flow) are designed to provide the necessary heat to the process and also to maintain uniform temperature throughout the reactor beds.

The part of the product stream containing oxygen with $CO_2$ at 23 is also sent to the combustor 31 for combustion purpose.

The horizontal combustor can be divided into different zones as shown at 24 to optimise the energy requirements. [The tentative temperature profiles of the oxidation and reduction reactors can be seen in the graph 25 located alongside the schematic drawing of the reactor with corresponding heights in the graph.]

The bed temperature in the oxidation reactor 15 will increase with height as oxidation is an exothermic process. At the same time, due to its endothermic nature, bed temperature in the reduction reactor 16 will decrease with height[, as seen in graph 25]. Thus, in an oxidation reactor, lower bed height will have lower temperature in opposite to high temperature in the reduction reactor. This will be completely opposite when at higher bed height. The design therefore provides scope for effective heat transfer as shown at 17 between the oxidation and reduction reactors across the full bed height.

The isothermal ICLAS reactor design as shown in FIG. 22 is designed to achieve the following important objectives:

1. to achieve efficient heat transfer between the reactors;
2. to maintain nearly constant oxygen partial pressures in the reactors by maintaining the uniform temperature profile across the fluidized bed using the double pipe heat exchanger.

Constant temperature profiles and oxygen partial pressures in the reactor are expected to improve the overall conversion as well as to increase the oxygen production compared to conventional dual circulating fluidised bed chemical looping systems.

Figure 24:
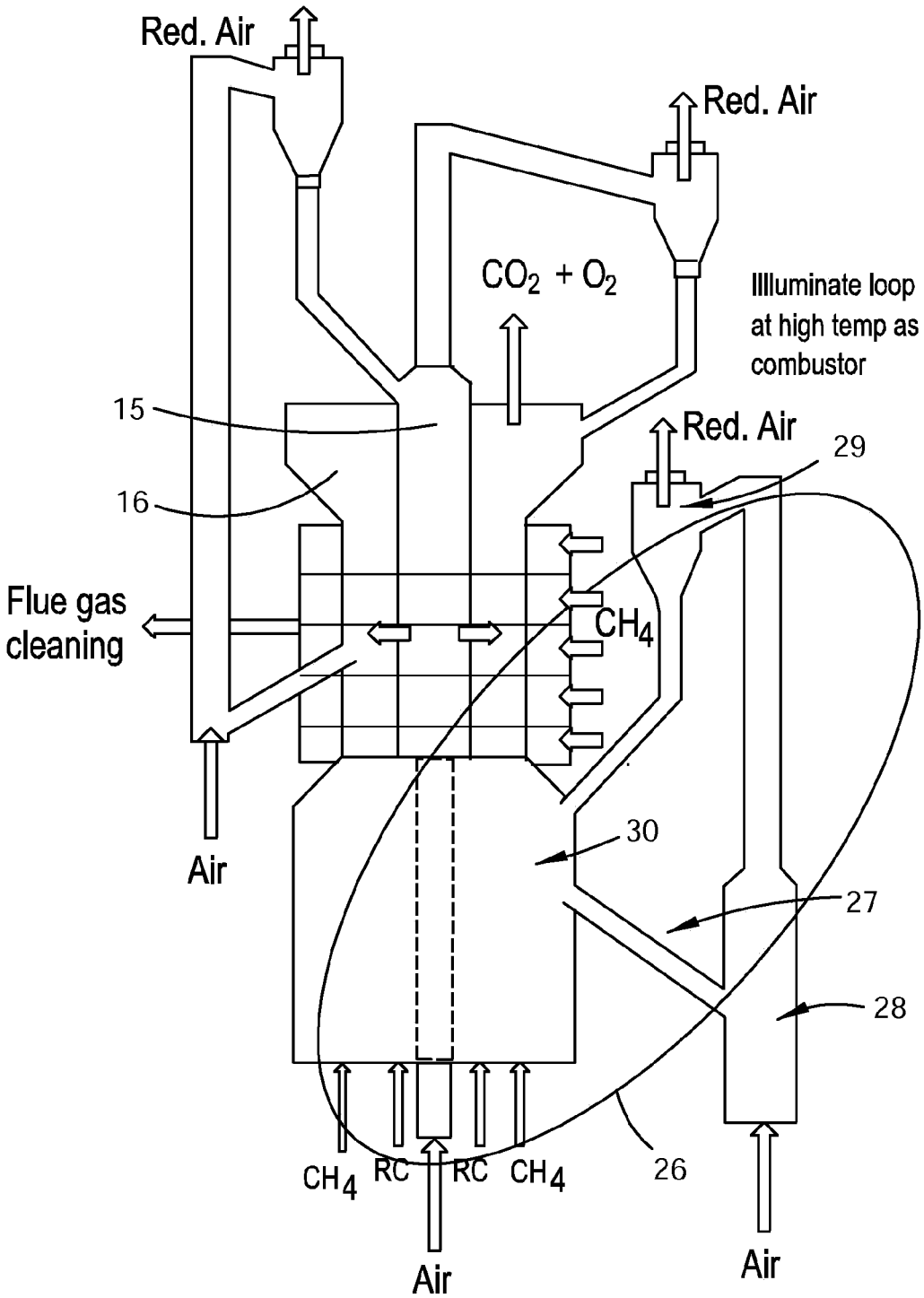
FIG. 24 is a similar reactor design to that shown in FIG. 22 with oxygen supplied by a chemical looping based combustor.

In an alternative form of ICLAS reactor design as shown in FIG. 24, the oxygen is supplied by a chemical looping based combustor generally shown by the apparatus within the zone 26. All other features in the reactor design shown in FIG. 24 are similar to those shown in FIG. 22.

In the "oxygen less" design shown in FIG. 24, the main difference is in supplying oxygen to the combustors. Rather than using a normal combustor as shown in FIG. 22, which will consume part of the production oxygen to combust extra $CH_4$ required for providing the heat necessary to the process, a chemical looping based combustor is provided as represented by the apparatus shown within zone 26. The chemical looping based combustor can use a number of oxygen carriers such as oxides of Cu, Mn, Co, Ni, Fe, Illuminite etc. In the particular example shown in FIG. 24, the use of Ni-oxide is illustrated.

The oxidation of Ni is carried out in the combustor oxidation reactor 28 with air. The oxidised nickel (i.e. NiO) is then transported to the reduction reactor 30 by cyclone 29. The reduced oxides by $CH_4$ in the reduction reactor are then transported back to the combustor oxidation reactor 28 using conduit 27.

In this manner, it is possible to provide an ICLAS unit in the form of an isothermal ICLAS (IICLAS) design to give very efficient operation for the section of the large scale oxyfuel power plant shown at 5 in FIG. 5.

The invention claimed is:

1. A method of air separation in large-scale oxy-fuel power generation plants of the type having a boiler to generate steam, said method including the steps of recycling flue gas from the boiler through a reduction reactor that is connected in a chemical looping process with an oxidation reactor such that the reduction reactor produces a mixture of oxygen and recycled flue gas, *wherein the oxidation reactor is located within the reduction reactor, enhancing heat transfer between the oxidation reactor and the reduction reactor,* and feeding said mixture back into the boiler, wherein a controlled proportion of the recycled flue gas *from the boiler* is fed through the chemical looping reduction reactor, with the remaining recycled flue gas being fed directly *back* to the boiler.

2. A method as claimed in claim 1, wherein the chemical looping process includes the steps of passing oxidised metal oxide and heat from the oxidation reactor to the reduction reactor, and passing reduced metal oxide from the reduction reactor to the oxidation reactor.

3. A method as claimed in claim 2 wherein the method is stabilized by manipulating the balance between the equilibrium and actual partial pressures of oxygen over the metal oxide.

4. A method as claimed in claim 3 wherein the actual partial pressure of oxygen in the oxidation reactor is maintained at levels above equilibrium oxygen partial pressure.

5. An apparatus for generating oxygen to be fed into a boiler in a large-scale oxy-fuel power generation plant, said apparatus including a reduction reactor, a flue gas recycling conduit arranged to transfer some of the flue gas emitted in use from the boiler to the reduction reactor and feed the remaining recycled flue gas directly to the boiler, an oxidation reactor connected to the reduction reactor [by transfer means arranged to transfer] *with* solid particulate material *being transferred* between the reduction reactor and the oxidation reactor, and an outlet conduit arranged to transfer oxygen and recycled flue gas mixture from the reduction reactor back into the boiler, *wherein the oxidation reactor is located within the reduction reactor, enhancing heat transfer between the oxidation reactor and the reduction reactor.*

6. An apparatus as claimed in claim 5 wherein the reduction reactor, the oxidation reactor, [the transfer means,] the flue gas recycling conduit and the outlet conduit form an integrated chemical looping air separation unit.

[7. An apparatus as claimed in claim 6 wherein the oxidation reactor passes through the middle of the reduction reactor, enhancing heat transfer between the oxidation reactor and the reduction reactor.]

8. An apparatus as claimed in claim [7] *5* wherein oxidised carrier particles from the oxidation reactor are passed upwardly to a cyclone separator where reduced air is exhausted and the oxidised carrier particles returned to the reduction reactor.

9. An apparatus as claimed in claim [7] *5*, wherein extra heat is provided using a chemical looping based combustor [which can produce oxygen by itself in its oxidation reactor].

10. An apparatus as claimed in claim 5 wherein the recycling flue gas conduit is connected to an electrostatic precipitator [which reduces], *a flue gas cleaner or a condenser to reduce* impurities in the recycled flue gas.

[11. An apparatus as claimed in claim 5 wherein the recycling flue gas conduit is connected to a flue gas cleaner which reduces impurities in the recycled flue gas.]

[12. An apparatus as claimed in claim 5 wherein the recycling flue gas conduit is connected to a condenser which reduces impurities in the recycled flue gas.]

[13. An apparatus as claimed in claim 5 wherein the recycling flue gas conduit is connected to a compressor which compresses a non-recycled portion of the flue gas.]

14. A method as claimed in claim 1 wherein the flue gas is recycled after electrostatic precipitation (ESP) of the flue gas which reduces impurities in the recycled flue gas.

15. A method as claimed in claim 1 wherein the flue gas is recycled after cleaning of the flue gas which reduces impurities in the recycled flue gas.

16. A method as claimed in claim 1 wherein the flue gas is recycled after condensation of the flue gas which reduces impurities in the recycled flue gas.

[17. A method as claimed in claim 1 wherein a non-recycled portion of the flue gas is compressed.]

*18. An apparatus as claimed in claim 8, wherein extra heat is provided using a chemical looping based combustor.*

*19. An apparatus for generating oxygen to be fed into a boiler in a large-scale oxy-fuel power generation plant, said apparatus including a reduction reactor, a flue gas recycling conduit arranged to transfer some of the flue gas emitted in use from the boiler to the reduction reactor and feed the remaining recycled flue gas directly to the boiler, an oxidation reactor connected to the reduction reactor by a loop seal arranged to transfer solid particulate material between the reduction reactor and the oxidation reactor, and an outlet conduit arranged to transfer oxygen and recycled flue gas mixture from the reduction reactor back into the boiler, wherein the oxidation reactor is located within the reduction reactor, enhancing heat transfer between the oxidation reactor and the reduction reactor.*

*20. An apparatus as claimed in claim 19 wherein the reduction reactor, the oxidation reactor, the loop seal, the flue gas recycling conduit and the outlet conduit form an integrated chemical looping air separation unit.*

*21. An apparatus as claimed in claim 19, wherein extra heat is provided using a chemical looping based combustor.*

*22. An apparatus as claimed in claim 19 wherein oxidised carrier particles from the oxidation reactor are passed upwardly to a cyclone separator where reduced air is exhausted and the oxidised carrier particles returned to the reduction reactor.*

*23. An apparatus as claimed in claim 22, wherein extra heat is provided using a chemical looping based combustor.*

*24. An apparatus as claimed in claim 19 wherein the recycling flue gas conduit is connected to an electrostatic precipitator, a flue gas cleaner or a condenser to reduce impurities in the recycled flue gas.*

* * * * *